United States Patent
Nakayama et al.

(10) Patent No.: US 10,103,550 B2
(45) Date of Patent: Oct. 16, 2018

(54) AGGREGATED AND OPTIMIZED VIRTUAL POWER PLANT CONTROL

(71) Applicant: FUJITSU LIMITED, Kawasaki-shi, Kanagawa (JP)

(72) Inventors: Kiyoshi Nakayama, Cupertino, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 256 days.

(21) Appl. No.: 15/000,970

(22) Filed: Jan. 19, 2016

(65) Prior Publication Data
US 2017/0207633 A1 Jul. 20, 2017

(51) Int. Cl.
| | |
|---|---|
| *H02J 3/38* | (2006.01) |
| *G05B 13/02* | (2006.01) |
| *H02J 3/00* | (2006.01) |
| *H04W 4/80* | (2018.01) |

(52) U.S. Cl.
CPC ............ *H02J 3/386* (2013.01); *G05B 13/026* (2013.01); *H02J 3/005* (2013.01); *H04W 4/80* (2018.02); *Y02D 70/00* (2018.01); *Y02D 70/142* (2018.01); *Y02D 70/144* (2018.01); *Y02D 70/162* (2018.01); *Y02D 70/22* (2018.01)

(58) Field of Classification Search
CPC ........ H02J 3/386; H02J 3/005; G05B 13/026; H04W 4/008; H04W 4/80; Y02D 70/00; Y02D 70/162; Y02D 70/22; Y02D 70/144; Y02D 70/142
See application file for complete search history.

(56) References Cited

U.S. PATENT DOCUMENTS

| | | | | |
|---|---|---|---|---|
| 8,260,468 | B2 | 9/2012 | Ippolito et al. | |
| 9,543,775 | B2 * | 1/2017 | Murayama | ................ H02J 3/00 |
| 9,807,099 | B2 * | 10/2017 | Matsuoka | .......... G06Q 30/0202 |

(Continued)

OTHER PUBLICATIONS

Aaron Zurborg, "Unlocking Customer Value: The Virtual Power Plant," WorldPower 2010 (2010).

(Continued)

*Primary Examiner* — Thomas C Lee
*Assistant Examiner* — Tri T Nguyen
(74) *Attorney, Agent, or Firm* — Maschoff Brennan

(57) ABSTRACT

A method of aggregated virtual power plant (VPP) control includes receiving control variable values. The control variables are received for control variables related to energy production and loads of devices electrically coupled to an electrical grid and communicatively coupled to the VPP controller server. The method includes inputting the control variable values into an objective algorithm. The method may include executing the objective algorithm. Executing the objective algorithm includes adjusting energy loads and energy production of prosumers, adjusting an energy amount supplied from a supply side for multiple time intervals, and adjusting curtailment of the energy loads in the prosumers based thereon. The method includes generating a VPP DR event schedule and communicating it to VPP client servers. The VPP DR event schedule includes control signals that are configured to affect an operating condition of the devices that are controlled by the VPP client servers.

20 Claims, 13 Drawing Sheets

(56) References Cited

U.S. PATENT DOCUMENTS

2008/0167756 A1* 7/2008 Golden .............. G05B 15/02
                                                    700/297
2012/0130556 A1  5/2012 Marhoefer
2012/0185106 A1  7/2012 Ghosh et al.

OTHER PUBLICATIONS

Wikipedia article "Intelligentes Stromnetz" of Sep. 30, 2015, https://de.wikipedia.ora/w/index.php?title=Intelliaentes_Stromnetz&oldid=146550634.

A. Di Giorgio, F. Liberati and A. Lanna, "Electric energy storage systems integration in distribution grids", 2015 IEEE 15th International Conference on Environment and Electrical Engineering (EEEIC), Rome, 2015, pp. 1279 to 1284, Jul. 23, 2015; Date of Conference Jun. 10 to 13, 2015; doi: 10.1109/EEE1C.2015.7165354.

DE Office Action dated Mar. 13, 2017 in application No. 10 2016 214 332.8.

\* cited by examiner

AGGREGATED AND OPTIMIZED VIRTUAL POWER PLANT CONTROL

FIELD

The embodiments discussed herein are related to aggregated virtual power plant control.

BACKGROUND

Utilities incentivize curtailment of energy usage and energy production during certain high load periods to increase the ability of the utilities to meet a larger demand or to reduce production costs. For example, in summer months, peak energy usage may occur on hot days in the late afternoon. A utility may offer an incentive to a factory to reduce energy usage during the late afternoon. In response, the factory may delay a high load production run until later in the evening, turn down the air-conditioning in the factory, or otherwise reduce energy use. Similarly, the utility may incentivize an increase in energy production at external energy generation devices (e.g., photovoltaic (PV) panels) during the late afternoon to meet a load imposed on the utility during the late afternoon. In this manner, the utility may increase its ability to meet energy demands during the peak energy usage and/or avoid producing or purchasing additional energy to meet the energy demands.

The curtailment in energy usage during peak or high load periods may be referred to generally as demand response (DR). The energy usage curtailment during a specified time period may be referred to as a DR event. DR events generally occur when a utility expects a high demand and asks customers to reduce or curtail energy usage. When a customer reduces its energy usage by an agreed-upon amount, the utility may provide an incentive to the customer.

Some electrical distribution systems may include distributed energy production and centralized energy production. For instance, an electrical distribution system may include a utility such as a coal power plant and multiple houses that are fit with PV panels. The houses with PV panels are an example of site-level energy production. The distributed energy may be integrated into the electrical distribution system. Accordingly, a portion of energy produced by the PV panels may be introduced into and distributed via the electrical grid.

The electrical distribution systems may include multiple sites. Groups of the sites may be organized as a virtual power plant (VPP). For example, the sites that include energy production capabilities may be organized into a VPP. When grouped into the VPP energy production and energy use of the sites included in the VPP may be collectively managed.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of aggregated virtual power plant (VPP) control may include receiving, at a VPP controller server, one or more control variable values from a previous time interval. The control variables may be received for control variables that are related to energy production and energy loads of devices that are electrically coupled to an electrical grid and communicatively coupled to the VPP controller server. The method may include inputting, at the VPP controller server, the control variable values into an objective algorithm. The objective algorithm is configured to increase a contribution of renewable energy production to serve a demand and integration of energy source devices communicatively coupled to the VPP controller server and to reduce energy generation and integration of energy produced by the utility. The method may include executing, by the VPP controller server, the objective algorithm. The executing the objective algorithm includes adjusting energy loads and energy production of one or more prosumers of the VPP, adjusting an energy amount supplied from a supply side of the VPP for one or more time intervals, and adjusting curtailment of the energy loads in the prosumers based on an adjusted energy supplied from the supply side of the VPP and adjusted energy loads and energy production of the one or more prosumers. Based on the objective function, the method may include generating, at the VPP controller server, a VPP DR event schedule that includes a charge/discharge schedule of one or more energy source devices, a charge/discharge schedule for one or more energy load devices, and a DR schedule for one or more of the energy source devices and the one or more energy load devices. The method may include communicating, by the VPP controller server, the VPP DR event schedule to one or more VPP client servers, the VPP DR event schedule including control signals that are configured to affect an operating condition of one or more of the devices that are controlled by the VPP client servers. The method may be implemented in a distribution system that includes an electrical grid, a utility, and a virtual power plant (VPP) that is configured to contribute energy to the electrical grid.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

A virtual power plant (VPP) includes a system that integrates various types of power sources such as photovoltaics (PVs), wind-turbines, small hydro, back-up generation sets, batteries, electric vehicles, among others, to provide a reliable overall power supply. The VPP may also include one or more prosumers. The prosumers are entities such as individuals or businesses that possess equipment and/or devices for energy generation and demand response. The VPP may include one or more systems that are configured to aggregate control of the equipment and to dispatch VPP demand response (DR) events. The systems may increase the renewable energy integration into an energy distribution system, which may reduce energy generation at a utility based on traditional energy sources such as fossil fuels.

In some VPPs, there is a supply side and a demand side (referred to as the prosumer side), which may include one or more prosumers. The supply side may include large size PVs, wind turbines, and supply-side batteries (supply batteries). The prosumer side may include small-size (e.g., residential) PVs, electric vehicles (EVs), and heating ventilation and air conditioning (HVAC) devices. The VPPs that include the supply side and the prosumer side may also be referred to as MicroGrids.

Current aggregation techniques implemented in VPPs only focus on the supply side or the prosumer side. In the VPPs that include the supply side and the prosumer side, there may not be a clear distinction between the supply side and the prosumer side. Thus, these aggregation techniques fail to adequately adjust energy use, energy production, and energy curtailment in the VPPs that include the supply side and the prosumer side.

Therefore, embodiments described in this disclosure may provide aggregation techniques that consider both the supply side and the prosumer side of the VPP. The aggregation techniques may adjust energy curtailment and energy production of the VPP, the adjusted energy curtailment and energy production may be adjusted based on equipment parameter, forecasted energy prices, energy demand values, and energy production values, energy market conditions, or some combination thereof.

Some embodiments may generate a VPP DR event schedule that may be implemented to control systems and equipment included in the VPPs. Some embodiments described in this disclosure may be configured to increase or maximize renewable energy integration. In addition, some of the embodiments described may be implemented in substantially real time and/or at a scheduled time interval such as every five minutes.

This and other embodiments are described herein with reference to the appended drawings. In the appended drawings, items similarly numbered have similar structures unless discussed otherwise.

Figure 1:
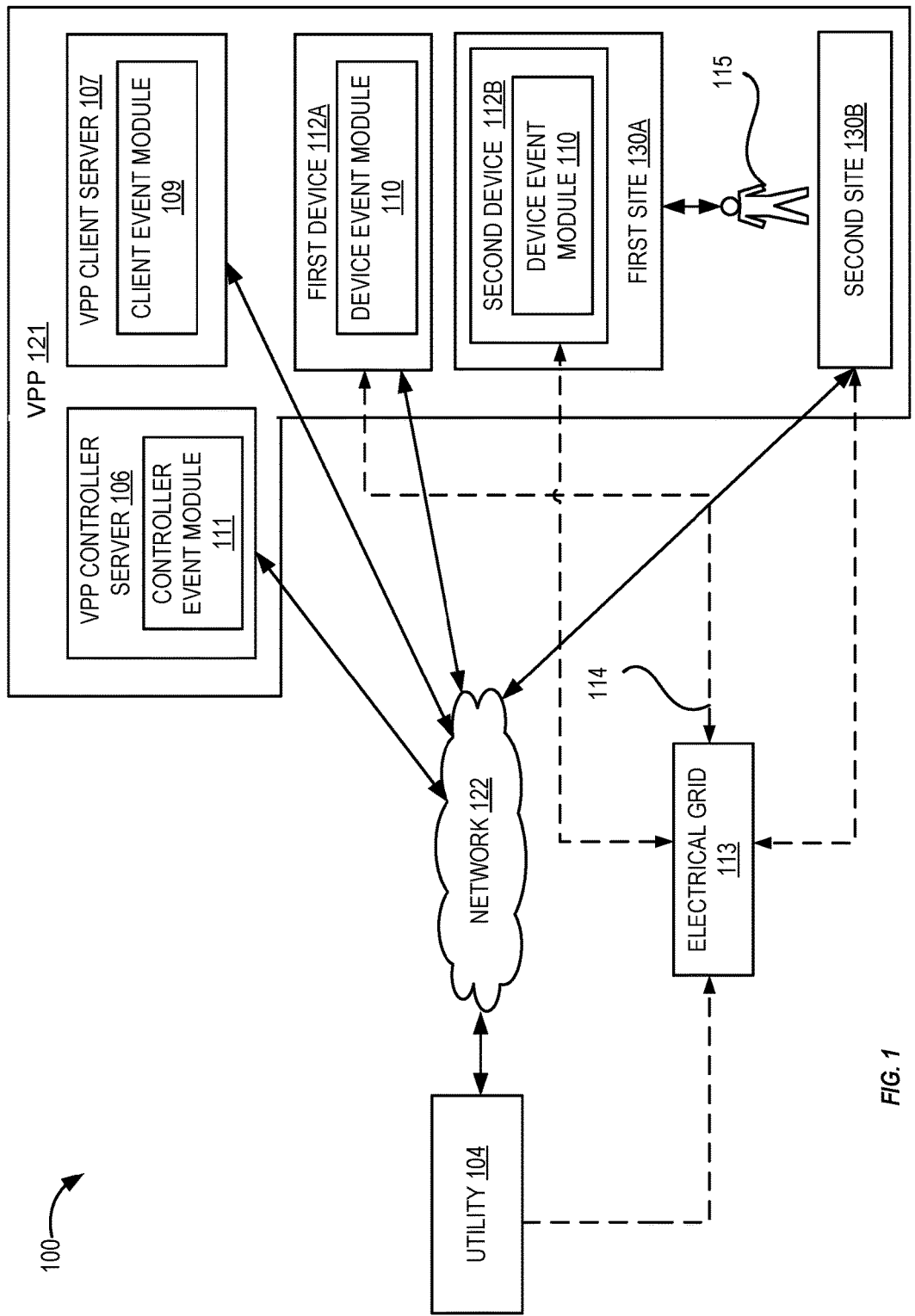
FIG. 1 is a block diagram of an example distribution system.

FIG. 1 is a block diagram of an example distribution system 100 in which aggregated and adjusted VPP control may be implemented. In the distribution system 100, a VPP 121 may include a VPP controller server (controller server) 106 and a VPP client server (client server) 107. The controller server 106 and/or the client server 107 may be configured to implement or control implementation of one or more VPP DR events. The VPP DR events may include transitions in the operational state of one or more devices 112A-112B (generally, device 112 or devices 112) that may be located at one or more sites 130A-130B (generally, site 130 or sites 130).

For instance, the VPP DR events may include communication of command signals via a network 122 from the controller server 106 to the client server 107 and then to the devices 112. The command signals may transition the operational states of the devices 112. The transition of operational states may include a transition from an ON state to an OFF state, or vice versa, a transition from a first operational mode (e.g., HIGH COOL) to a second operational mode (e.g., LOW COOL), a change in an operational setting (e.g., a thermostatic setting change), an increase or decrease of power generation setting, other transitions or some combination thereof.

Control of the operational states of the devices 112 may affect energy use and/or energy production in the distribution system 100. Control of the energy use and the energy production may balance energy use and energy production in the distribution system 100, reduce energy production by the utility 104, increase a contribution of renewable energy production to serve a demand in the distribution system 100, or some combination thereof. For example, the sites 130 and/or the devices 112 may include a particular load (e.g., 30 kilowatthours (kWh) per day). Without implementation of a VPP DR event, to meet the particular load, energy may be supplied to a utility 104 or purchased in an energy market via an electrical grid 113. During periods of increased load imposed by the sites 130 and/or devices 112 or other periods, one or more VPP DR events may be implemented to reduce the load imposed on the utility 104, which may reduce energy purchased in the energy market. Additionally or alternatively, the VPP DR events may be implemented to produce excess energy in addition to the energy produced by the utility 104. The excess energy may be sold on the energy market. Moreover, the load imposed by the devices 112 may be curtailed while energy production of the devices 112 may be increased, which may create additional excess energy that may be sold on the energy market.

Implementation of a VPP DR event may be based on a VPP DR event schedule. The VPP DR event schedule generally dictates times in which the devices 112 are controlled and which of the devices 112 are controlled.

In the distribution system 100, multiple, sequential VPP DR events may be implemented. For example, the VPP DR events may be implemented in on an ongoing basis on a particular time interval. The particular time interval may be every five minutes. One or more of the sequential VPP DR events may use information obtained from a previous VPP DR event.

In the embodiment of FIG. 1, the distribution system 100 includes the utility 104, the controller server 106, the client server 107, the sites 130, the electrical grid 113, and the devices 112, which are collectively referred to as system components. The system components may be configured to communicate data and information related to the VPP DR events via the network 122. For example, the VPP DR event schedule, control signals that transition operational states of the devices 112, and information pertaining to the devices 112 may be communicated via the network 122. In the following paragraphs, each of the system components is described.

The network 122 may include wired or wireless, and may have configurations including a star configuration, token ring configuration, or other configurations. Furthermore, the network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols.

In some embodiments, the network 122 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc. The network 122 may enable communication via a standard-based protocol such as smart energy profile (SEP), Echonet Lite, OpenADR, or another suitable protocol (e.g., wireless fidelity (Wi-Fi), ZigBee, HomePlug Green, etc.).

The sites 130 may include buildings, structures, equipment, or other objects that use energy distributed by the utility 104. The sites 130 may include multiple types of structures ranging from private residences to large industrial factories or office buildings. In the VPP 121, one or more of the sites 130 may be associated with a prosumer 115. The prosumer 115 may include an entity that is a customer of the utility 104, and also an owner of equipment (e.g., the second device 112B) that may provide some energy to the electrical grid 113. In some embodiments, the VPP 121 may include the sites 130 that are predominantly residences and/or small and medium-size business (SMB) sites.

One of more of the sites 130 may include the devices 112. Additionally, some of the devices 112 may not necessarily be associated with a site 130. For example, as discussed more below, the VPP 121 may include a supply side and a prosumer side. Generally, the supply side of the VPP 121 may include one or more devices 112 that are not associated with one of the sites 130 while the prosumer side may include one or more of the devices 112 that are associated with one of the sites 130.

The devices 112 may include any device that consumes energy distributed by the utility 104 or generates energy that may be distributed in the distribution system 100 (e.g., to one or more of the sites 130) or transferred to the electrical grid 113. Additionally or alternatively, the devices 112 may control operation of a device 112 that consumes energy or generates energy. For example, one or more of the devices 112 may include a switch, a thermostat, controller, electrical breaker, etc. that controls operation of one or more of the devices 112. Some examples of the devices 112 include an electric vehicle (EV), a photovoltaic panel (PV), an air conditioner (AC), a thermostat, a switch, a pool heater, a water heater, a ventilation unit, a thermostatically controlled unit, a fan, a household appliance, a fuel cell, a controller for a piece of equipment, a smart appliance, a piece of commercial or industrial equipment, a clothes dryer, a freezer, a refrigerator, a heater, ventilation, and air conditioner (HVAC) system, a battery charger, a wind generator, other appliances, and other pieces of equipment that consume, produce, or control consumption or production of energy.

The devices 112 may include a device event module 110. The device event module 110 may be configured to receive a control signal via the network 122. Based on the control signal, an operational state of the device 112 or a device controlled by the device 112 may be altered, transitioned, or maintained. In addition, the device event module 110 may communicate information to one or both of the controller server 106 and the client server 107 via the network 122. For example, a status signal and/or a receipt confirmation may be communicated from the device event module 110 to one or both of the controller server 106 and the client server 107.

In some embodiments, the device event module 110 may include routines configured to respond to signals sent in a DR program such as Direct Load Control (DLC) program. In a DLC program, one or both of the controller server 106 and the client server 107 may directly control state transitions of one or more of the devices 112. In other embodiments, the device event module 110 may be configured to implement other types of DR programs.

The device event module 110 may be implemented using hardware including a processor, a microprocessor (e.g., to perform or control performance of one or more operations), a field-programmable gate array (FPGA), or an application-specific integrated circuit (ASIC). In some other instances, the device event module 110 may be implemented using a combination of hardware and software. Implementation in software may include rapid activation and deactivation of one or more transistors or transistor elements such as may be included in hardware of a computing system (e.g., the device 112). Additionally, software defined instructions may operate on information within transistor elements. Implementation of software instructions may at least temporarily reconfigure electronic pathways and transform computing hardware.

In the distribution system 100, the utility 104 may distribute energy, which may include electricity, to the sites 130, the devices 112, and the electrical grid 113. The distribution of the energy by the utility 104 to the sites 130 and the devices 112 is denoted in FIG. 1 at 114. The utility 104 may include any entity involved in production, transmission, and/or distribution of electricity. The utility 104 may be publicly owned or may be privately owned. Some examples of the utility 104 may include a power plant, an energy cooperative, and an independent system operator (ISO). Although not shown in the FIG. 1, the distribution system 100 may include multiple other sites to which energy is supplied. For example, the distribution system 100 may be included in a regional or national electrical distribution system including hundreds or thousands of sites.

In the embodiment of FIG. 1, the VPP 121 groups the first site 130A, the devices 112, and the second site 130B. Conceptually, the VPP 121 may be viewed as a power plant, which is similar to the utility 104, in the distribution system 100. The VPP 121 may, under some conditions, provide energy to the electrical grid 113. In particular, one or more of the devices 112 may include energy source devices that may produce energy. The energy produced by the energy source devices may be distributed to the electrical grid 113 and may offset energy produced by the utility 104. In addition, the VPP 121 may produce energy that is used by the sites 130 and/or devices 112 included in the VPP 121. For instance, the first device 112A may include a PV, which may provide energy to the sites 130.

The VPP 121 may also include one or more energy load devices. For example, one or more of the devices 112 may include an HVAC device. The energy load devices may impose a load on the distribution system, and may not provide an energy production capability.

The VPP 121 may implement software control that regulates operation of the sites 130 and/or devices 112 included therein. For example, in some embodiments, the VPP 121 may use DR signaling (e.g., OpenADR) that may control energy consumption and energy production of the sites 130 and/or devices 112 in the VPP 121.

In the embodiment of FIG. 1, the VPP 121 includes the controller server 106 and the client server 107. One or both of the controller server 106 and the client server 107 may include a hardware server that includes a processor, memory, and communication capabilities. The controller server 106 and/or the client server 107 may be configured to communicate with the devices 112 and/or the sites 130 via the network 122. The controller server 106 and/or the client server 107 may be configured to generate VPP DR schedules and implement VPP DR events based thereon.

The controller server 106 may include a controller event module 111. The controller event module 111 may be configured to generate, control, and dispatch a VPP DR event. In some embodiments, the controller event module 111 may be configured for aggregated control of the VPP 121 and in particular, generation and dispatch of the VPP DR event. For example, in these and other embodiments, the controller event module 111 may be configured to receive one or more control variable values. The control variable values may be from a previous time interval for one or more control variables. The control variables may be related to energy production and energy loads of the devices 112 that are electrically coupled to the electrical grid 113 and communicatively coupled to the controller server 106. Some examples of the control variables are elsewhere in this disclosure.

The controller event module 111 may input the control variable values into an objective algorithm for the current time interval. The objective algorithm may be configured to increase a contribution of renewable energy production to serve a demand in the distribution system 100 and/or integration of energy source devices (e.g., 112) that are communicatively coupled to the VPP controller server 106 and to reduce energy generation and integration of energy produced by the utility 104.

The controller event module 111 may execute the objective algorithm. Execution of the objective algorithm may include adjusting energy loads and energy production of the prosumer 115 of the VPP 121, adjusting energy supplied from a supply side of the VPP 121, and adjusting curtailment of the energy loads in the prosumer 115. The controller event module 111 may generate the VPP DR event schedule based on the objective function. The VPP DR event may include a charge/discharge schedule of one or more energy source devices (e.g., the devices 112), a charge/discharge schedule for one or more energy loads, and a DR schedule for one or more of the energy source devices and the one or more energy load devices.

The controller event module 111 may communicate the VPP DR event schedule to the client server 107. The VPP DR schedule may include control signals that are configured to affect the operating condition of the devices 112 that are controlled by the client server 107. The client server 107 may include a client event module 109. The client event module 109 may be configured to receive information such as a VPP DR event schedule from the controller event module 111. The client event module 109 may further communicate control signals based on the VPP DR event schedule to the devices 112 and/or sites 130.

The controller event module 111 and/or client event module 109 may be implemented using hardware including a processor, a microprocessor (e.g., to perform or control performance of one or more operations), an FPGA, or an ASIC. In some other instances, the controller event module 111 and/or client event module 109 may be implemented using a combination of hardware and software. Implementation in software may include rapid activation and deactivation of one or more transistors or transistor elements such as may be included in hardware of a computing system (e.g., the controller server 106). Additionally, software defined instructions may operate on information within transistor elements. Implementation of software instructions may at least temporarily reconfigure electronic pathways and transform computing hardware.

Modifications, additions, or omissions may be made to the distribution system 100 without departing from the scope of the present disclosure. The present disclosure may apply to distribution systems that may include one or more prosumers 115, one or more sites 130, one or more devices 112, one or more utilities 104, one or more VPPs 121, one or more electrical grids 113, one or more controller servers 106, one or more client servers 107, or any combination thereof.

Moreover, the separation of various components in the embodiments described herein is not meant to indicate that the separation occurs in all embodiments. It may be understood with the benefit of this disclosure that the described components may be integrated together in a single component or separated into multiple components.

Figure 2:
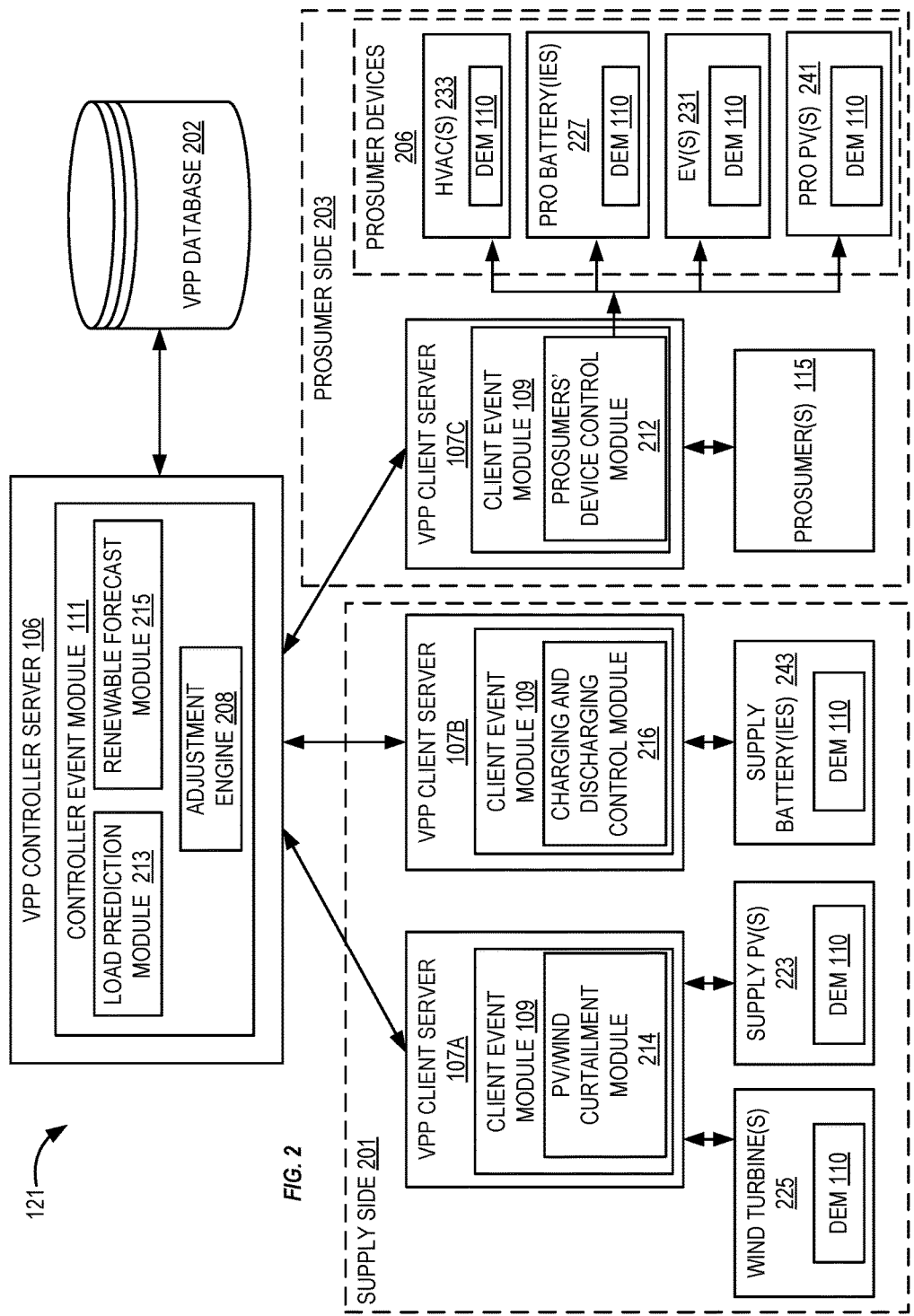
FIG. 2 is a block diagram of an example virtual power plant (VPP) that may be implemented in the distribution system of FIG. 1.

FIG. 2 depicts an example embodiment of the VPP 121 described with reference to FIG. 1. The VPP 121 of FIG. 2 includes the controller server 106, and three of the client servers 107 of FIG. 1, which are labeled 107A-107C in FIG. 2. The VPP 121 of FIG. 2 includes one or more prosumers 115 described with reference to FIG. 1.

The VPP 121 of FIG. 2 may include a supply side 201 and a prosumer side 203. The supply side 201 includes larger-scale energy source devices, such as one or more supply-side PVs (supply PVs) 223, one or more wind turbines 225, and one or more larger-scale supply batteries 243. The "larger-scale" indicates that the energy source devices and supply batteries 243 are not associated with a particular one of the prosumers 115 and sized to supply or store energy for multiple sites (e.g., the sites 130 of FIG. 1). Although not explicitly disclosed, the supply side 201 of the VPP 121 may also include additional or different types of energy source devices. For example, the VPP 121 may include hydropower plants, combined heat and power (CHP) units, other energy source devices, or some combination thereof.

The prosumer side 203 may include one or more prosumer devices 206. The prosumer devices 206 may include energy source devices such as one or more prosumer PV (in FIG. 2 "pro PVs") 241. The prosumer devices 206 may also include energy load devices such as one or more HVAC devices (in FIG. 2 "HVAC 233") 233 and one or more EVs 231. The prosumer devices 206 may also include one or more prosumer batteries (pro batteries) 227, which may also be referred to as stationary batteries. The prosumer devices 206 may be associated with a particular one of the prosumers 115. Generally, a subset of the prosumer devices 206 is associated with one of the prosumers 115. The subset of the prosumer devices 206 may include energy source devices and/or energy load devices, in any combination. For example, one of the prosumers 115 may include a residential energy customer. At a residence of the prosumer 115, there may be a pro PV 241 (e.g., installed on a roof of the residence); one of the EVs 231 that the prosumer 115 operates and charges at the residence; an air conditioner that cools the residence; and a pro battery 227 that is charged at least partially by the pro PV 241. Other prosumers 115 may include a different subset of the prosumer devices 206 (e.g., no EV 231).

In the embodiment of FIG. 2, each of the wind turbines 225, the supply PVs 223, the supply batteries 243, the HVACs 233, the pro batteries 227, the EVs 231, and the pro PVs 241 include the device event module (in FIG. 2 "DEM 110") 110. As discussed above, the device event module 110 may be configured to receive control signals from the client event module 109. In response to the control signal, the device event module 110 may affect or transition, directly or indirectly, the operational state of the device. Additionally or alternatively, in response to the control signal, the device event module 110 may communicate information to the client server 107, the controller server 106, the VPP database 202, or some combination thereof. The information may be communicated via a network, such as the network 122 discussed above.

In the embodiment of FIG. 2, each of the client servers 107A-107C includes an embodiment of the client event module 109 of FIG. 1. The client event modules 109 in FIG. 2 each include a sub-module 212, 214, and 216. The sub-modules 212, 214, and 216 may be configured to interface with the devices (e.g., 225, 223, 243, 241, 227, 231, 233, and 206) communicatively coupled to the client server 107. In some embodiments, a single client event module 109 may include two or more of the sub-modules 212, 214, and 216 or one or more other sub-modules that may be configured to interface with the devices communicatively coupled to the client server 107.

For example, the client server 107A may be communicatively coupled to the wind turbines 225 and the supply PVs 223. Accordingly, the client event module 109 in the client server 107A may include a PV/wind curtailment module 214. The PV/wind curtailment module 214 may control operation of the wind turbines 225 and/or the supply PVs 223. The control of the operation of the wind turbines 225 and/or the supply PVs 223 may be based at least partially on a VPP DR schedule that may be generated by an adjustment engine 208 of the controller event module 111. Likewise, a charging and discharging control module 216 and a prosumers device control module 212 may be configured to control the supply batteries 243 and the prosumer devices 206, respectively.

In the embodiment of FIG. 2, the controller server 106 includes the controller event module 111. The controller event module 111 may include a load prediction module 213, a renewable forecast module 215, and an adjustment engine 208.

The load prediction module 213 may be configured to forecast energy loads. In the depicted embodiment, the load prediction module 213 may be configured to forecast energy loads in a prosumer side 203 of the VPP 121. For example, the load prediction module 213 may read historical data and/or environmental data, such as weather data, and forecast loads that may be imposed by an HVAC device 233. Some examples of historical data may include loads from one or more earlier time intervals, loads from times with similar environmental conditions, loads imposed by similar VPPs 121 in other geographic locations, and loads imposed by similar prosumer devices 206.

In embodiments that include multiple prosumers 115, the load prediction module 213 may forecast an energy load imposed by one or more of the multiple prosumers 115. Additionally or alternatively, the load prediction module 213 may forecast loads imposed by other of the prosumer devices 206 (e.g., the EVs 231). Moreover, the load prediction module 213 may forecast loads at a series or sequence of times. For example, the load prediction module 213 may receive historical data and/or environmental data every five minutes or another suitable time interval. Based on the historical data and/or the environmental data, the load prediction module 213 may forecast loads for a current time interval. The load prediction module 213 may communicate the forecasted loads to the adjustment engine 208. In some embodiments, the forecasted loads are represented by the forecasted load expression:

$$\{l_1(t), l_2(t), \ldots, l_M(t)\}.$$

In the forecasted load expression, M represents a number of prosumers 115. The parameter t represents a time interval. The parameter $l_i(t)$ represents the forecasted load for one of the prosumers 115 identified by an indexing variable i at a particular time interval. The forecasted loads may be included in the control variables, which may be used by the adjustment engine 208.

The renewable forecast module 215 may be configured to forecast energy generation in the VPP 121. In the depicted embodiment, the renewable forecast module 215 may be configured to forecast energy production in the prosumer side 203 and a supply side 201 of the VPP 121. For example, the renewable forecast module 215 may read historical data and/or environmental data, such as weather data, and forecast energy production by one or more of the wind turbines 225, the supply PVs 223, the pro PVs 241, or other energy source devices that may be implemented in the VPP 121.

In embodiments that include multiple prosumers 115, multiple wind turbines 225, multiple supply PVs 223, the renewable forecast module 215 may forecast an energy production by one or more of each of the prosumers 115, the multiple wind turbines 225, and the multiple supply PVs 223. Moreover, the renewable forecast module 215 may forecast energy production at a series or sequence of times. For example, the renewable forecast module 215 may receive historical data and/or environmental data every five minutes or another suitable time interval. Based on the historical data and/or the environmental data, the renewable forecast module 215 may forecast energy production for a current time interval. The renewable forecast module 215 may communicate the forecasted energy production amounts to the adjustment engine 208. In some embodiments, the forecasted energy production amounts are represented by forecasted energy production expressions:

$$\{p_1(t), p_2(t), \ldots, p_M(t)\};$$

$$\{r_1(t), r_2(t), \ldots, r_N(t)\}; \text{ and}$$

$$\{w_1(t), w_2(t), \ldots, w_H(t)\}.$$

In the forecasted energy production expressions, M and t are as described above. The parameter N represents a number of supply PVs 223. The parameter H represents a number of wind turbines 225. The parameter $p_i(t)$ represents the forecasted energy production for one of the pro PVs 241 for one of the prosumers 115 identified by an indexing variable i at a particular time interval. The parameter $r_j(t)$ represents the forecasted energy production for one of the supply PVs 223 identified by an indexing variable j at a particular time interval. The parameter $w_k(t)$ represents the forecasted energy production for one of the wind turbines 225 identified by an indexing variable k at a particular time interval. The forecasted energy production may be included in the control variables, which may be used by the adjustment engine 208.

The VPP 121 may include a VPP database 202. The VPP database 202 may communicate with the controller server 106 and/or one or more of the client servers 107. The client servers 107, the controller server 106, the prosumer devices 206, or some combination thereof may upload real-time device information and other information to the VPP database 202. Some examples of the real-time device information may include operating statuses, charge levels, and environmental conditions. The adjustment engine 208, the load prediction module 213, and the renewable forecast module 215 may access the VPP database 202 and may forecast energy production and loads based at least partially thereon. Some examples of information communicated to the VPP database 202 may include energy or charging levels of the pro batteries 227, energy or charging levels of the EVs 231, energy or charging levels of the supply batteries 243, other information, or some combination thereof.

In some embodiments, charging levels of the pro batteries 227 may be defined according to a pro battery charging level expression:

$$\{s_1(t), s_2(t), \ldots, s_M(t)\}$$

In the pro battery charging level expression, the parameters M and t are as described above. The parameter $s_i(t)$ represents the charge level for one of the pro batteries 227 identified by an indexing variable i at a particular time interval.

In some embodiments, charging levels of the EVs 231 may be defined according to an EV charging level expression:

$$\{e_1(t), e_2(t), \ldots, e_M(t)\}.$$

In the EV charging level expression, the parameters M and t are as described above. The parameter $e_i(t)$ represents the charge level for one of the EVs 231 identified by an indexing variable i at a particular time interval.

In some embodiments, charging levels of the supply batteries 243 may be defined according to a supply battery expression:

$$\{b_1(t), b_2(t), \ldots, b_J(t)\}.$$

In the supply battery expression, the parameter t is as described above. The parameter $b_c(t)$ represents the charge level for one of the supply batteries 243 identified by an indexing variable c at a particular time interval. The parameter J represents a number of supply batteries 243. In some embodiments, one or more of the charging levels of the supply batteries 243, the charging levels of the pro batteries 227, and the charging levels of the EVs 231 may be included in the control variables, which may be used by the adjustment engine 208.

The adjustment engine 208 may be configured to execute the objective algorithm. In some embodiments, the objective algorithm may be defined according to an objective algorithm expressions:

$$\min \Sigma_{t=0}^{T} G(t);$$

Over:

$$G, f, q, \Delta r, \omega, \Delta w, \Delta l, o^d, o^s, o^e, o^p, \Delta p, u, v, x, y, z;$$

Subject to:

$$G(t) \geq 0;$$

$$D(t) = S(t);$$

$$D(t) = \Sigma_{i=1}^{M} l_i(t);$$

$$S(t) = \Sigma_{i=1}^{M} \{\Delta l_i(t) + o_i^d(t) + u_i(t) + x_i(t) + z_i(t)\}.$$

In the objective algorithm expressions, M, t, and $l_i(t)$ are as described above. The min operator represents a minimization operator. The function G(t) represents an amount of energy generated by traditional energy sources at a particular time interval. For example, G(t) may represent an amount of energy supplied by a utility such as the utility 104 of FIG. 1. A parameter T represents a final time interval over which the amount of energy supplied by the utility is minimized. The function D(t) represents a demand or sum of the loads at a particular time interval. The function S(t) represents energy supplied at a particular time interval.

Figure 3A:
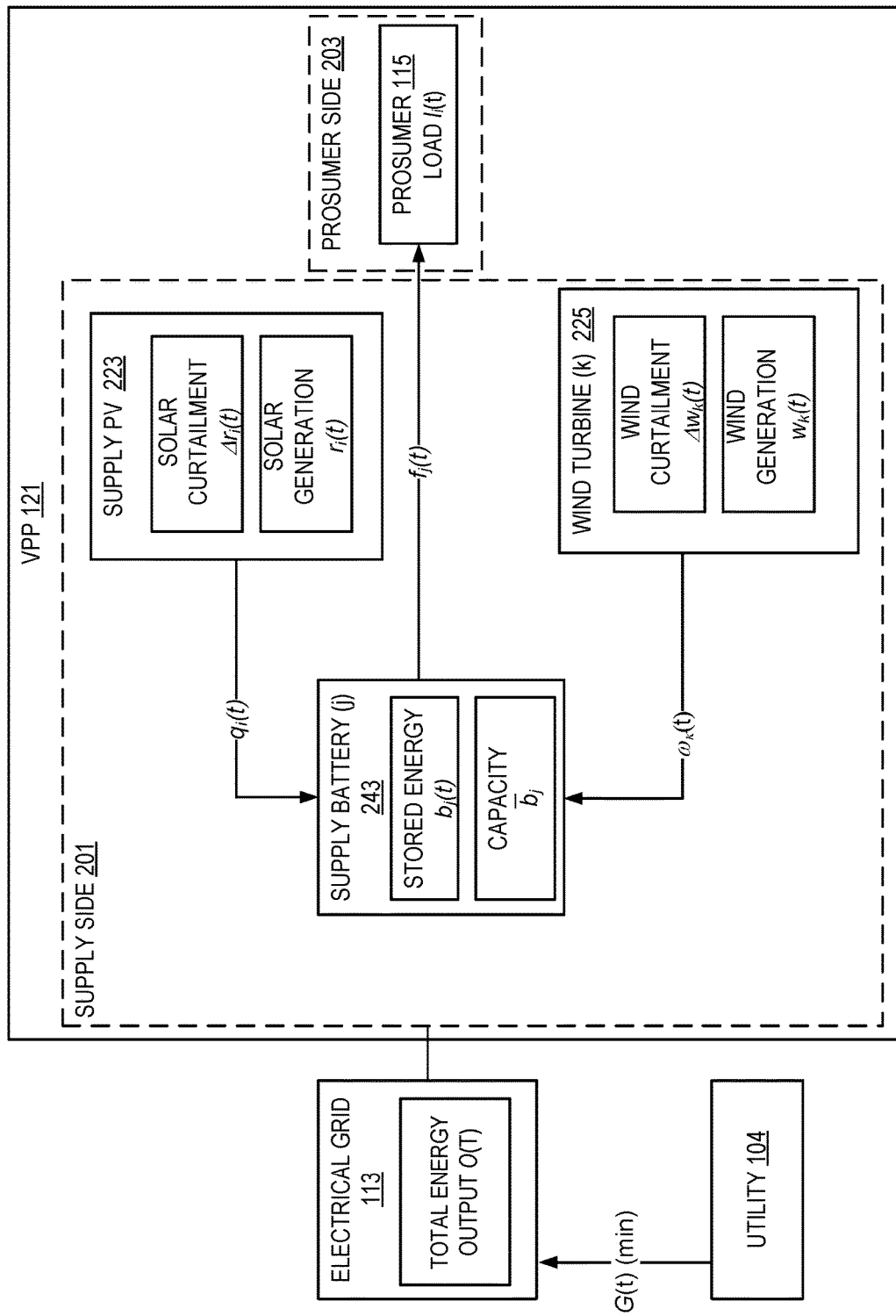
FIG. 3A is a block diagram of an example of the VPP of FIG. 2.
Figure 3B:
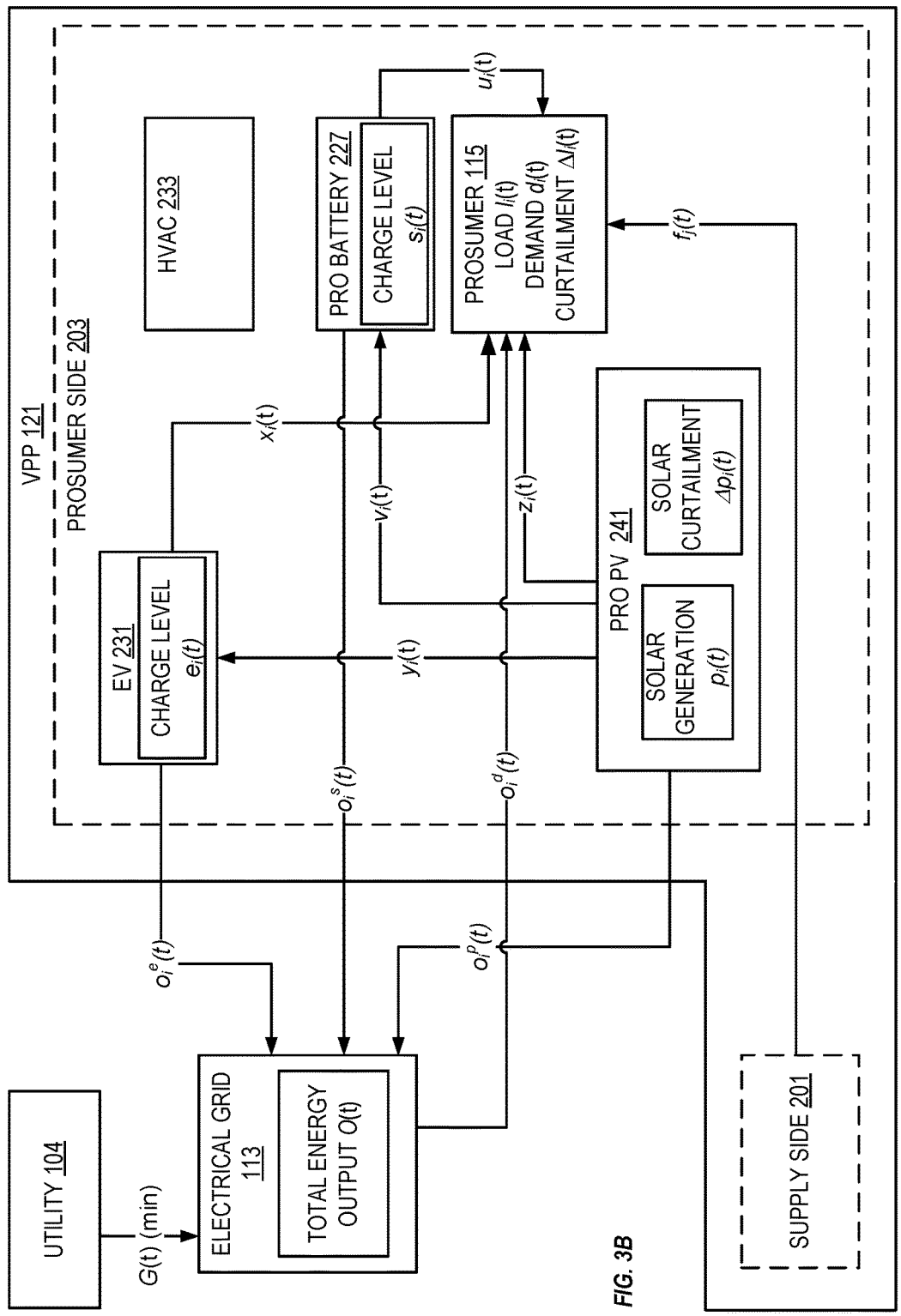
FIG. 3B is another block diagram an example of the VPP of FIG. 2.

Each of the parameters $f$, $q$, $\Delta r$, $\omega$, $\Delta w$, $\Delta l$, $o^d$, $o^s$, $o^e$, $o^p$, $\Delta p$, $u$, $v$, $x$, $y$, $z$ and derivations thereof are described with reference to FIGS. 3A and 3B. FIGS. 3A and 3B depict example embodiments of the VPP 121 of FIGS. 1 and 2. The VPP 121 is depicted with the electrical grid 113 and the utility 104 of FIG. 1. In FIG. 1, distribution of energy is denoted by reference number 114. Instead, in FIGS. 3A and 3B, one or more sources of energy are labeled with a parameter notation.

In FIG. 3A, example details of the supply side 201 are depicted and a simplified representation of the prosumer side 203 is depicted. The prosumer side 203 includes one of the prosumers 115. The prosumer 115 includes a forecasted load (hereinafter, "load") of the prosumer 115 at a particular time interval, which is represented by $l_i(t)$. The notation $l_i(t)$ is described above.

Referring to the supply side 201, the parameter $q_i(t)$ represents a charge amount from one of the supply PVs 223 that is numbered according to an indexing variable i to the supply battery 243, which is numbered according to an indexing variable j. The parameter $\Delta r_i(t)$ represents curtailment amount of PV generation (in FIG. 3A "solar curtailment") of the supply PV 223 at a particular time interval. As described above, $r_i(t)$ represents the forecasted energy production for one of the supply PVs 223 at a particular time interval.

In some embodiments, a relationship between the charge amount from the supply PVs 223 to the supply battery 243, the curtailment amount of the PV generation, and the forecasted energy production for one of the supply PVs 223 may be defined according to a PV balance factor. The PV balance factor may be defined according to PV balance factor expressions:

$$R_i(t) = 0;$$

$$R_i(t) = r_i(t) - \Delta r_i(t) - q_i(t);$$

$$0 \leq \Delta r_i(t) \leq r_i(t); \text{ and}$$

$$0 \leq q_i(t) \leq \bar{q}_i.$$

In the PV balance factor expressions, $r_i(t)$, $\Delta r_i(t)$, and $q_i(t)$ are as described above. The parameter $R_i(t)$ represents the PV balance factor at a particular time interval. The parameter $\bar{q}_i$ represents a maximum energy that may be transferred from the supply PV 223 to the supply battery 243.

The parameter $w_k(t)$ represents a charge amount from one the wind turbines 225 that is numbered according to an indexing variable k to the supply battery 243. The parameter $\Delta w_k(t)$ represents the curtailment amount of wind generation (in FIG. 3A "wind curtailment") of the wind turbine 225 at a particular time interval. As described above, $w_k(t)$ represents the forecasted energy production for one of the wind turbines 225 at a particular time interval.

In some embodiments, a relationship between the charge amount of the wind turbines 225 to the supply battery 243, the curtailment amount of wind generation of the wind turbine 225, and the forecasted energy production of the wind turbine 225 may be defined according to a wind generation balance factor. The wind generation balance factor may be defined according to wind generation balance factor expressions:

$W_k(t)=0;$ $W_k(t)=w_k(t)-\Delta w_k(t)-\omega_k(t);$ $0 \leq \Delta w_k(t) \leq w_k(t);$ and $0 \leq w_k(t) \leq \overline{\omega_k}.$ In the wind generation balance factor expressions, $w_k(t)$, $\Delta w_k(t)$, $\omega_k(t)$, and $\omega_k(t)$ are as described above. The parameter $W_k(t)$ represents the wind generation balance factor at a particular time interval. The parameter $\overline{\omega_k}$ represents a maximum energy production for wind turbine 225.

The parameter $f_j(t)$ represents a discharge amount from the supply battery 243 to the load of the prosumer 115. The supply battery 243 includes a capacity, which is represented in FIG. 3A by $\overline{b_j}$. As discussed above, the parameter $b_j(t)$ represents energy stored in the supply battery 243.

In some embodiments, the energy stored in the supply battery 243 may be defined according to supply battery storage expressions:

$b_j(t)=b_j(t-1)+\Sigma_{i=1}{}^{\gamma_j}q_i(t)+\Sigma_{k=1}{}^{\beta_j}\omega_k(t)-f_j(t);$ and $0 \leq b_j(t) \leq \overline{b_j}.$ In the battery storage expressions, $b_j(t)$, $\overline{b_j}$, $b_j(t-1)$, $q_i(t)$, and $\omega_k(t)$ are as described above. The parameter $\gamma_j$ represents a number of supply PVs 223 connected to the supply battery 243 and the parameter represents $\beta_j$ a number of wind turbines 225 connected to the supply battery 243.

In some embodiments, a total amount of energy supplied to the prosumer(s) 115 may include a sum of discharge amounts from multiple supply batteries 243. The sum of the discharge amounts from the multiple supply batteries 243 may be defined according to total prosumer energy supply expressions:

$-\overline{f_j} \leq f_j(t) \leq \overline{f_j};$ and $F(t)=\Sigma_{j=1}{}^{J}f_j(t).$ In the total prosumer energy supply expressions, t, J, and $f_j(t)$ are as described above. The parameter $\overline{f_j}$ represents a maximum amount of energy that may be provided to the prosumer 115. The parameter $F(t)$ represents the total amount of energy supplied to the prosumers 115.

Referring to FIG. 3B, details of the prosumer side 203 of the VPP 121 are provided. The prosumer side 203 includes the prosumer 115 of FIG. 3A. In FIG. 3B, the supply side 201 is depicted as a single box. FIG. 3B includes the line from the supply side 201 to the prosumer 115 that represents the discharge amount from the supply battery 243 ($f_j(t)$).

The prosumer side 203 may include one of the EVs 231 of FIG. 2. In the embodiment of FIG. 3B, the EV 231 includes various energy inputs and energy outputs. For example, the parameter $x_i(t)$ represents a discharge amount from the EV 231 to the load of a prosumer 115. The parameter $y_i(t)$ represents a charge amount from the pro PV 241 to the EV 231. The parameter $o_i{}^e(t)$ represents a discharge output from the EV 231 to the electrical grid 113. As discussed above, the EV 231 may also include a charge level $e_i(t)$.

In some embodiments, the charge level may be defined according to charge level expressions:

$e_i(t)=e_i(t-1)-x_i(t)+y_i(t)-o_i{}^e(t);$ $0 \leq e_i(t) \leq \overline{e_i};$ $0 \leq x_i(t) \leq \overline{x_i};$ $0 \leq y_i(t) \leq \overline{y_i};$ and $-\overline{o_i{}^e} \leq o_i{}^e(t) \leq \overline{o_i{}^e}.$ In the charge level expressions, t, t−1, $y_i(t)$, $x_i(t)$, $e_i(t)$, and $o_i{}^e(t)$ are as described above. The parameter $\overline{x_i}$ represent a maximum amount of energy that may be provided from the EV 231 to the prosumer 115. The parameter $\overline{e_i}$ represents a maximum amount of energy that may be stored in the EV 231. The parameter $\overline{y_i}$ represents a maximum amount of energy that may be provided from the pro PV 241 to the EV 231. The parameter $\overline{o_i{}^e}$ represents a maximum amount of energy that may be provided from the EV 231 to the electrical grid 113.

The prosumer side 203 may include one of the pro PVs 241 of FIG. 2. In the embodiment of FIG. 3B, the pro PV 241 includes various energy inputs and energy outputs. For example, the parameter $v_i(t)$ represents a charge amount from the pro PV 241 to the pro battery 227. The parameter $z_i(t)$ represents an amount of energy sent from the pro PV 241 to the load of the prosumer 115. The parameter or $o_i{}^p(t)$ represents a discharge output from the pro PV 241 to the electrical grid 113.

In some embodiments, the discharge output for the pro PV 241 may be defined according to pro PV discharge output expressions:

$o_i{}^p(t)=p_i(t)-\Delta p_i(t)-v_i(t)-y_i(t)-z_i(t);$ $0 \leq \Delta p_i(t) \leq p_i(t);$ $0 \leq z_i(t) \leq \overline{z_i};$ and $0 \leq o_i{}^p(t) \leq \overline{o_i{}^p}.$ In the pro PV discharge output expressions, $z_i(t)$, $v_i(t)$, $o_i{}^p(t)$, $z_i(t)$, $\Delta p_i(t)$, and $p_i(t)$ are as described above. The parameter $\overline{z_i}$ represents a maximum amount of energy provided to the prosumer 115 from the pro PV 241. The parameter $\overline{o_i{}^p}$ represents a maximum amount of energy provided to the electrical grid 113 from the pro PV 241.

The prosumer side 203 may include one of the pro batteries 227 of FIG. 2. In the embodiment of FIG. 3B, the pro battery 227 includes various energy inputs and energy outputs. The parameter $u_i(t)$ represents a discharge amount from the pro battery 227 to the load of the prosumer 115. The parameter $o_i{}^s(t)$ represents a discharge output from the pro battery 227 to the electrical grid 113.

The charge level of the pro battery 227 is depicted as $s_i(t)$ in FIG. 3B. In some embodiments, the charge level of the pro battery 227 may be defined according to pro battery charge level expressions:

$s_i(t)=s_i(t-1)-u_i(t)+v_i(t)-o_i{}^s(t);$ $0 \leq s_i(t) \leq \overline{s_i};$ $0 \leq u_i(t) \leq \overline{u_i};$ $0 \leq v_i(t) \leq \overline{v_i};$ and $-\overline{o_i{}^s} \leq o_i{}^s(t) \leq \overline{o_i{}^s};$ In the pro battery charge level expressions, $s_i(t)$, $o_i{}^s(t)$, $u_i(t)$, and $v_i(t)$ are as described above. The parameter $\overline{s_i}$ represents a capacity of the pro battery 227. The parameter $\overline{u_i}$ represents a maximum amount of energy that may be provided to the prosumer 115 by the pro battery 227. The parameter $\overline{v_i}$ represents a maximum amount of energy that may be provided to the pro battery 227 from the pro PV 241. The parameter $\overline{o_i^s}$ represents a maximum amount of energy that may be provided to the electrical grid 113 from the pro PV 241.

The prosumer 115 in FIG. 3B includes the load described above as well as a curtailment and a demand. The parameter $\Delta l_i(t)$ represents the curtailment of the load $l_i(t)$ of the prosumer 115. As discussed above, the load $l_i(t)$ represents a forecasted load imposed on the utility 104 and/or the electrical grid 113. The parameter $d_i(t)$ represents the demand. The parameter $o_i^d(t)$ represents energy sent from the electrical grid 113 to the load of the prosumer 115. Generally, the demand is the load adjusted by the other energy inputs and the curtailment. For example, in some embodiments, the demand may be defined according to demand expressions:

$$d_i(t)=l_i(t)-\Delta l_i(t)-u_i(t)-x_i(t)-z_i(t);$$

$$d_i(t)=o_i(t);$$

$$0 \leq \Delta l_i(t) \leq \overline{l_i};$$

$$L(t)=\Sigma_{i=1}^M \Delta l_i(t); \text{ and}$$

$$0 \leq o_i^d(t) \leq \overline{o_i^d}.$$

In the demand expressions, M, $d_i(t)$, $l_i(t)$, $\Delta_i(t)$, $o_i^d(t)$, $u_i(t)$, $x_i(t)$, and $z_i(t)$ are as described above. The parameter $L(t)$ represents a total curtailment in the VPP 121. The total curtailment may be equal to a sum of the curtailments of the loads $l_i(t)$. The parameter $\overline{o_i^d}$ represents a maximum amount of energy that may be supplied to the prosumer 115 by the electrical grid 113. The parameter $\overline{l_i}$ represents a maximum value for a curtailment amount.

In the embodiment of FIG. 3B, the electrical grid 113 may include total output energy to the electrical grid 113. The parameter $O(t)$ represents the total output energy to the electrical grid 113. In some embodiments, the total output energy may be defined according to total output energy expressions:

$$O(t)=F(t)+\Sigma_{i=1}^M o_i^s(t)+\Sigma_{i=1}^M o_i^e(t)+\Sigma_{i=1}^M o_i^p(t)-\Sigma_{i=1}^M o_i^d(t)+G(t); \text{ and}$$

$$O(t) \geq 0.$$

In the total output energy expressions, $O(t)$, $o_i^s(t)$, $o_i^e(t)$, $G(t)$, $o_i^d(t)$, $o_i^p(t)$, and $F(t)$ are as described above.

In some embodiments, the prosumer 115 may not include one or more of the HVAC 233, the EV 231, the pro battery 227, and the pro PV 241. For example, if the prosumer 115 does not have an HVAC device 233, the curtailment capacity may be zero ($\overline{l_i}=0$). Accordingly, if the prosumer 115 does not have an HVAC device 233, a curtailment amount may be zero ($\Delta l_i(t)=0$).

Additionally or alternatively, if the prosumer 115 does not have a pro battery 227 a capacity of the pro battery 227 is zero ($\overline{s_i}=0$). Accordingly, if the prosumer 115 does not have a pro battery 227 a charge level of the pro battery 227 may be zero ($s_i(t)=0$), a discharge capacity of the pro battery 227 may be zero ($\overline{u_i}=0$), a discharge amount of the pro battery 227 may be zero ($u_i(t)=0$), a charge capacity of a pro battery is $\overline{v_i}=0$, thus a charge amount from the pro PV 241 to the pro battery 227 may be zero ($v_i(t)=0$), and a discharge output from the pro battery 227 to the electrical grid 113 may be zero ($o_i^s(t)=0$).

Additionally or alternatively, if the prosumer 115 does not have the EV 231, the capacity of the EV 231 is $\overline{e_i}=0$. In addition, the energy level of the EV 231 may be zero ($e_i(t)=0$), a discharge capacity of the EV 231 may be zero ($\overline{x_i}=0$), and a discharge amount of the EV 231 to the prosumer 115 may be zero ($x_i(t)=0$), a charge capacity from the pro PV 241 to the EV 231 may be zero ($\overline{y_i}=0$), a charge amount from the pro PV 241 to the EV 231 may be zero ($y_i(t)=0$), and a discharge output from the EV 231 to the electrical grid 113 may be zero ($o_i^e(t)=0$).

Additionally or alternatively, if the prosumer 115 does not have the pro PV 241, renewable energy generation from the pro PV 241 may be zero ($p_i(t)=0$), and thus a curtailment amount of the pro PV 241 may be zero ($\Delta p_i(t)=0$). In addition, a charge capacity from the pro PV 241 to the pro battery 227 may be zero ($\overline{v_i}=0$), a charge amount from the pro PV 241 to the pro battery 227 may be zero ($v_i(t)=0$), a charge capacity from the pro PV 241 to the EV 231 may be zero ($\overline{y_i}=0$), a charge amount from the pro PV 241 to the EV 231 may be zero ($y_i(t)=0$), a maximum amount of energy sent from the pro PV 241 to the prosumer 115 may be zero ($\overline{z_i}=0$), a charge amount from the pro PV 241 to the prosumer 115 may be zero ($z_i(t)=0$), and a discharge output from the pro PV 241 to the electrical grid 113 may be zero ($o_i^p(t)=0$).

Referring back to FIG. 2, the adjustment engine 208 may be configured to execute the objective algorithm. Execution of the objective algorithm may include three phases. In a first phase, for each of the prosumers 115 energy loads and energy production may be adjusted and/or optimized. In a second phase, for each time interval (e.g., every 5 minutes) an energy amount supplied from the supply side 201 may be adjusted and/or optimized. In a third phase, curtailment of the energy loads in the prosumers 115 may be adjusted and/or optimized based on the optimizations and/or adjustments in phase 1 and phase 2. For example, the curtailment may be optimized and/or adjusted based on energy supplied from the supply side 201 and optimized and/or adjusted energy loads and energy production of the prosumers 115.

In some embodiments, to adjust the energy loads and the energy production of the prosumers 115 the adjustment engine 208 may receive: initial energy levels of EVs 231 of the prosumers 115 $\{e_1(0), e_2(0), \ldots, e_M(0)\}$, initial energy levels of pro batteries 227 of the prosumers 115 $\{s_1(0), s_2(0), \ldots, s_M(0)\}$, forecasted PV production for the current time interval for the prosumers 115 $\{p_1(t), p_2(t), \ldots, p_M(t)\}$, forecasted loads for the current time interval for the prosumers 115 $\{l_1(t), l_2(t), \ldots, l_M(t)\}$, or some combination thereof. The objective function may be set to minimize or reduce the curtailed amount of generation at the pro PV 241 ($\Delta p_i(t)$).

Based thereon, the adjustment engine 208 may generate an adjusted value for: a curtailed amount of generation at the pro PV 241 ($\Delta p_i(t)$), a discharge amount from the pro battery 227 ($u_i(t)$), a charge amount from the pro PV 241 to the pro battery 227 ($v_i(t)$), a discharge amount from the EV 231 ($x_i(t)$), a charge amount from the pro PV 241 of the prosumer 115 to the EV 231 ($y_i(t)$), an amount of energy sent from the pro PV 241 directly to the load of the prosumer 115 ($z_i(t)$), discharge output from the pro batteries 227 associated with the prosumer 115 to the electrical grid 113 ($o_i^s(t)$), discharge output from the EVs 231 associated with the prosumer 115 to the electrical grid 113 ($o_i^e(t)$), discharge output from the pro PVs 241 associated with the prosumer 115 to the electrical grid 113 ($o_i^p(t)$), or some combination thereof. An example, of such generation is outlined with respect to method 600 discussed below.

In some embodiments, to adjust energy supplied from the supply side 201 of the VPP 121, the adjustment engine 208 may receive: initial charge levels of supply batteries 243 of the supply side 201 of the VPP 121 $\{b_1(0), b_2(0), \ldots, b_J(0)\}$, forecasted renewable generation for the supply PV 223

$\{r_1(t), r_2(t), \ldots, r_N(t)\}$, forecasted wind generation for the wind turbines 225 $\{w_1(t), w_2(t), \ldots, w_H(t)\}$, forecasted loads for the prosumers 115 $\{l_1(t), l_2(t), \ldots, l_M(t)\}$, and adjusted values for $\Delta p_i(t)$, $u_i(t)$, $v_i(t)$, $x_i(t)$, $y_i(t)$, $z_i(t)$, $o_i^s(t)$, $o_i^e(t)$, and $o_i^p(t)$ based on the adjustment or optimization of the energy loads and the energy production of the prosumers 115. The objective function from the supply side 201 may be set to minimize or reduce curtailment amount of PV generation ($\Delta r_i(t)$) and curtailment amount of wind generation ($\Delta w_k(t)$). For example, the objective function may be represented functionally by:

$$\min \Sigma_{i=1}^{N} \Delta r_i(t) + \Sigma_{k=1}^{H} \Delta w_k(t).$$

Based thereon, the adjustment engine 208 may generate adjusted values for a charge amount from the supply PV 223 to the supply battery 243 ($q_i(t)$), a curtailment amount of PV generation ($\Delta r_i(t)$), a charge amount from the wind turbine 225 to the supply battery 243 ($\omega_k(t)$), a curtailment amount of wind generation ($\Delta w_k(t)$), a discharge amount from the supply battery 243 to loads of the prosumers 115 ($f_j(t)$), and energy sent from the electrical grid 113 to a load at a prosumer 115 ($o_i^d(t)$), or some combination thereof. An example, of such generation is outlined with respect to method 700 discussed below.

In some embodiments, to adjust both the energy loads in the prosumers 115 and energy supplied from the supply side 201, the adjustment engine 208 may receive curtailment capacity of the prosumers 115 $\{\bar{l}_1, \bar{l}_2, \ldots \bar{l}_M\}$, discharge rates of the supply batteries 243 for time intervals $\{f_1(t), f_2(t), \ldots, f_J(t)\}$, and updated sets of demands that are based on adjusted energy loads and energy production of the one or more prosumers of the VPP and adjusted energy supplied from the supply side of the VPP $\{d_1(t), d_2(t), \ldots, d_M(t)\}$. Based thereon, the adjustment engine 208 may generate a set of curtailment amounts of loads for the prosumers 115 and for the time intervals ($\Delta l_i(t)$). The objective function may be set to minimize or reduce reliance from traditional energy source, $G(t)$, i.e. to maximize or increase a contribution from renewable resources, which may be represented functionally as:

$$\min \Sigma_{t=0}^{T} G(t).$$

Additionally, in some embodiments, to adjust curtailment of the energy loads the adjustment engine 208 may determine whether a total demand that is not covered by the renewable resource is smaller than a DR capacity. For example, in some embodiments, a determination may be performed according to demand/capacity comparison expressions:

$$\Sigma_{i=1}^{M} \delta_i(t) - \Sigma_{j=1}^{J} f_j(t) \leq \Sigma_{i=1}^{M} \bar{l}_i; \text{ and}$$

$$\delta_i(t) = l_i(t) - u_i^*(t) - x_i^*(t) - z_i^*(t).$$

In the demand/capacity comparison expression, $f_j(t)$, $l_i(t)$, $u_i^*(t)$, $x_i^*(t)$, $z_i^*(t)$ and $\bar{l}_i$, are as described above. The * represents the optimal instances without consideration of applying demand response. The parameter $\delta_i(t)$ represents a demand of one of the prosumers 115 that may not be covered by the local resources of the prosumers 115. The parameter $\Sigma_{i=1}^{M} \bar{l}_i$ represents the DR capacity. The parameter $\Sigma_{i=1}^{M} \delta_i(t)$ represents the total demand that may not be covered by the local resources of the prosumers 115. In addition, a function, $F(t) = \Sigma_{j=1}^{J} f_j(t)$ represents a sum of the discharge amounts from the multiple supply batteries 243.

In response to the total demand that may not be covered by both the local resources of the prosumers 115 and the supply batteries 243 being smaller than the DR capacity, the adjustment engine 208 may select a subset of the prosumers 115 to include in the VPP DR event. The selection may be based on one or more of participation likelihood of the prosumers 115 for past DR events or VPP DR events, curtailment capacity and estimation, number of available and occupied resources, a benefits and costs analysis, or some combination thereof. In response to the total demand being greater than the DR capacity, the adjustment engine 208 may include all the prosumers 115 with a capacity amount. Accordingly, a total curtailment may be defined according to a total curtailment expression:

$$\sum_{i=1}^{M} \Delta l_i(t) = \begin{cases} \sum_{i=1}^{M} \delta_i(t) - \sum_{j=1}^{J} f_j(t) & \text{if } \sum_{i=1}^{M} \delta_i(t) - \sum_{j=1}^{J} f_j(t) < \sum_{i=1}^{M} \bar{l}_i \\ \sum_{i=1}^{M} \bar{l}_i, & \text{otherwise} \end{cases}$$

In the total curtailment expression, the parameters are as described above. $\Sigma_{i=1}^{M} \Delta l_i(t)$ represents the total curtailment.

Figure 4:
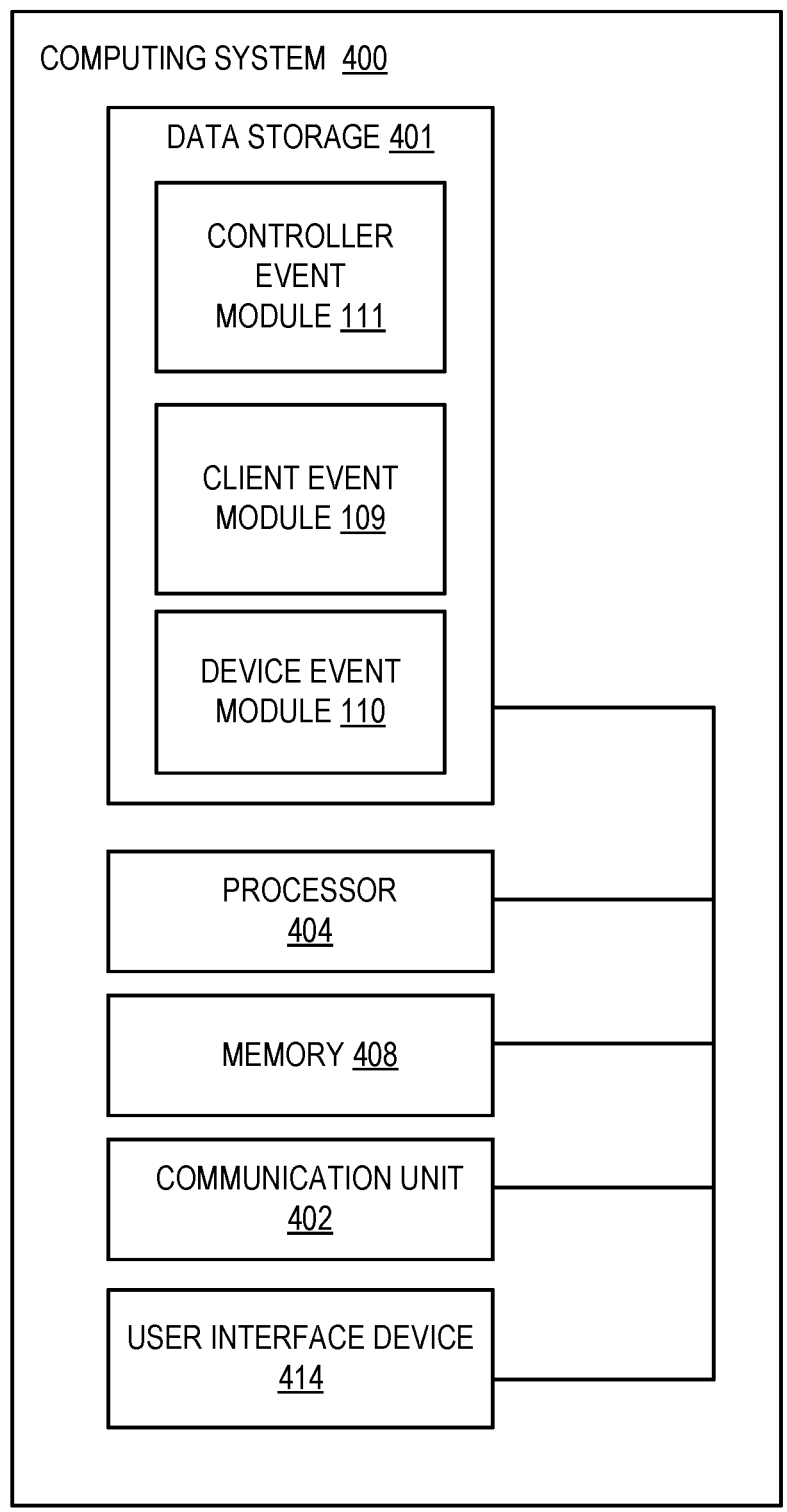
FIG. 4 illustrates an example computing system configured for aggregated VPP control.

FIG. 4 illustrates an example computing system 400 configured for aggregated VPP control. The computing system 400 may be implemented in the distribution system 100 of FIG. 1 and/or the VPP 121 of FIGS. 2-3B. Examples of the computing system 400 may include one or more of the controller server 106, the client server 107, or one or more of the devices 112. The computing system 400 may include one or more processors 404, a memory 408, a communication unit 402, a user interface device 414, and a data storage 401 that includes one or more of the controller event module 111, the client event module 109, and the device event module 110 (collectively, modules 109/110/111).

The processor 404 may include any suitable special-purpose or general-purpose computer, computing entity, or processing device including various computer hardware or software modules and may be configured to execute instructions stored on any applicable computer-readable storage media. For example, the processor 404 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 4, the processor 404 may more generally include any number of processors configured to perform individually or collectively any number of operations described in the present disclosure. Additionally, one or more of the processors 404 may be present on one or more different electronic devices or computing systems. In some embodiments, the processor 404 may interpret and/or execute program instructions and/or process data stored in the memory 408, the data storage 401, or the memory 408 and the data storage 401. In some embodiments, the processor 404 may fetch program instructions from the data storage 401 and load the program instructions in the memory 408. After the program instructions are loaded into the memory 408, the processor 404 may execute the program instructions.

The memory 408 and the data storage 401 may include computer-readable storage media for carrying or having computer-executable instructions or data structures stored thereon. Such computer-readable storage media may include any available media that may be accessed by a general-purpose or special-purpose computer, such as the processor 404. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 404 to perform a certain operation or group of operations.

The communication unit 402 may include one or more pieces of hardware configured to receive and send communications. In some embodiments, the communication unit 402 may include one or more of an antenna, a wired port, and modulation/demodulation hardware, among other communication hardware devices. In particular, the communication unit 402 may be configured to receive a communication from outside the computing system 400 and to present the communication to the processor 404 or to send a communication from the processor 404 to another device or network.

The user interface device 414 may include one or more pieces of hardware configured to receive input from and/or provide output to a user. In some embodiments, the user interface device 414 may include one or more of a speaker, a microphone, a display, a keyboard, a touch screen, or a holographic projection, among other hardware devices. In these and other embodiments, the user interface device 414 may be configured to receive input from a prosumer (e.g., 115) or administrator of a utility (e.g., 104), for example.

The modules 109/110/111 may include program instructions stored in the data storage 401. The processor 404 may be configured to load the modules 108/109/110 into the memory 408 and execute the modules 109/110/111. Alternatively, the processor 404 may execute the modules 108/109/110 line-by-line from the data storage 401 without loading them into the memory 408. When executing the modules 108/109/110 the processor 404 may be configured to perform a VPP DR event dispatch as described elsewhere in this disclosure.

Modifications, additions, or omissions may be made to the computing system 400 without departing from the scope of the present disclosure. For example, in some embodiments, the computing system 400 may not include the user interface device 414. In some embodiments, the different components of the computing system 400 may be physically separate and may be communicatively coupled via any suitable mechanism. For example, the data storage 401 may be part of a storage device that is separate from a server, which includes the processor 404, the memory 408, and the communication unit 402, that is communicatively coupled to the storage device.

Figure 5:
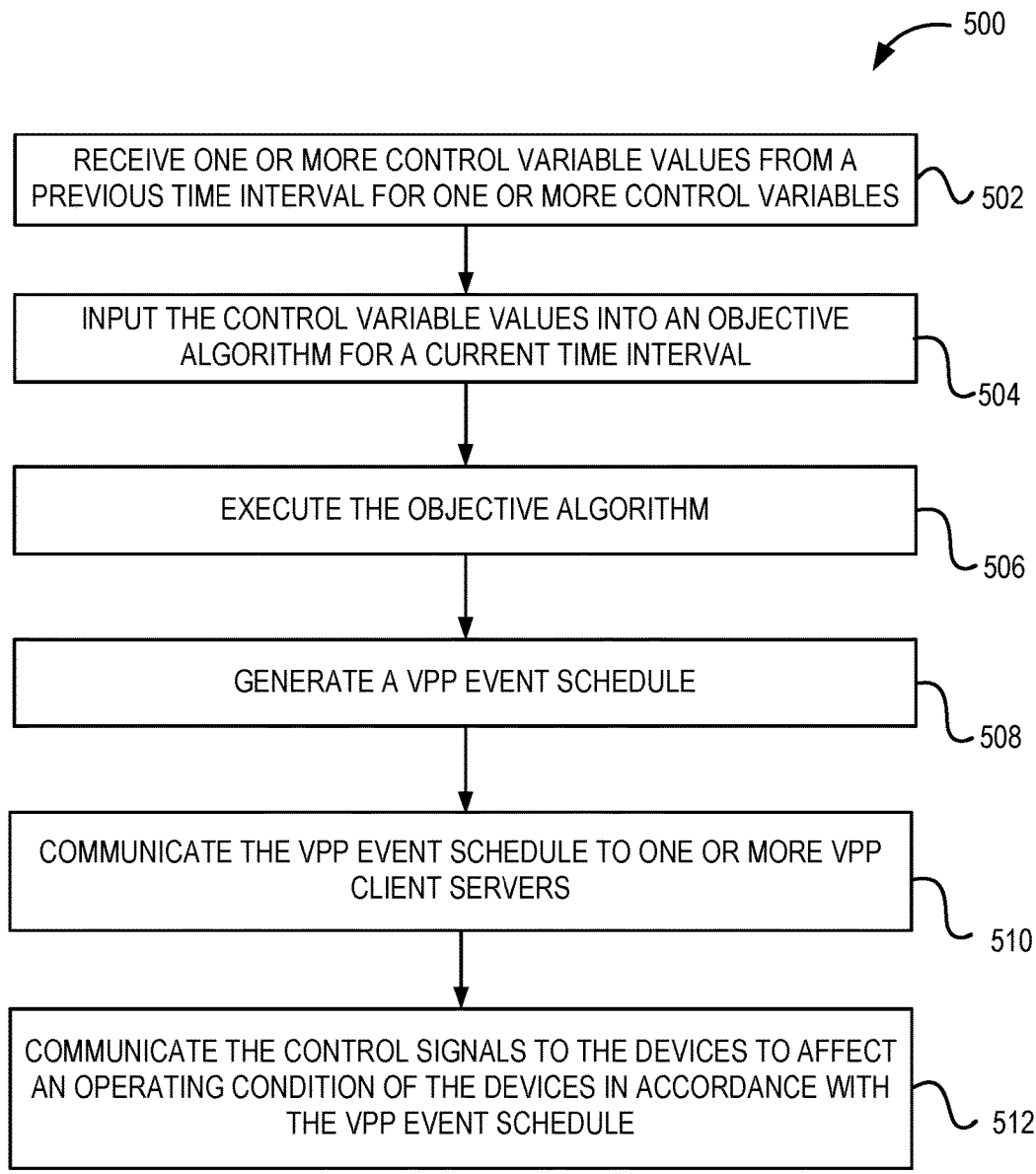
FIG. 5 is a flow diagram of an example method of aggregated VPP control.

FIG. 5 is a flow diagram of an example method 500 of aggregated VPP control, arranged in accordance with at least one embodiment described herein. The method 500 may be performed in a distribution system such as the distribution system 100 of FIG. 1 in which the utility 104 provides energy to the sites 130. The method 500 may be programmably performed in some embodiments by the controller server 106 described with reference to FIGS. 1 and 2. In some embodiments, the controller server 106 or another computing system may include or may be communicatively coupled to a non-transitory computer-readable medium (e.g., the memory 408 of FIG. 4) having stored thereon programming code or instructions that are executable by one or more processors (such as the processor 404 of FIG. 4) to cause a computing system and/or the controller server 106 to perform or control performance of the method 500. Additionally or alternatively, the controller server 106 may include the processor 404 described above that is configured to execute computer instructions to cause the controller server 106 or another computing system to perform or control performance of the method 500. Although illustrated as discrete blocks, various blocks may be divided into additional blocks, combined into fewer blocks, or eliminated, depending on the desired implementation.

At block 502, one or more control variable values may be received. The control variable values may be received at a VPP controller server such as the controller server 106 of FIGS. 1 and 2. The control variable values may be from a previous time interval for one or more control variables that may be related to energy production and energy loads. For example, with reference to FIGS. 1 and 2, the control variable may be related to an energy product of the devices 112 (e.g., 225, 223, 243, 233, 227, 231, 241, and 206) that are electrically coupled to the electrical grid 113 and communicatively coupled to the controller server 106.

At block 504, the control variable values may be input into an objective algorithm for a current time interval. With reference to FIGS. 1 and 3, the control variable values may be input at a VPP controller server, such as the controller server 106. In some embodiments, the objective algorithm may be configured to increase a contribution of renewable energy production to serve a demand and integration of energy source devices communicatively coupled to the VPP controller server and to reduce energy generation and integration of energy produced by a utility. For instance, with reference to FIGS. 1-3B, the objective algorithm may increase a contribution renewable energy production to serve a demand and integration of energy source devices (e.g., 112, 225, 223, 243, 233, 227, 231, 241, and 206) communicatively coupled to the controller server 106 and to reduce energy generation and integration of energy produced by the utility 104.

At block 506, the objective algorithm may be executed. In some embodiments, a VPP controller server may be configured to execute the objective algorithm. Execution of the objective algorithm may include adjusting energy loads and energy production of one or more prosumers of the VPP, adjusting energy supplied from a supply side of the VPP for one or more time intervals, adjusting curtailment of the energy loads in the prosumers based on an adjusted energy supplied from the supply side and adjusted energy loads and energy production of the one or more prosumers, or some combination thereof.

In some embodiments, adjustment of the energy loads and the energy production of the one or more prosumers may include receiving as one or more inputs. The inputs may include initial energy levels of EVs of the one or more prosumers $\{e_1(0), e_2(0), \ldots, e_M(0)\}$, initial energy levels of pro batteries of the one or more prosumers $\{s_1(0), s_2(0), \ldots, s_M(0)\}$, forecasted PV production for the current time interval for one or more of the prosumers $\{p_1(t), p_2(t), \ldots, p_M(t)\}$, forecasted loads for the current time interval for one or more of the prosumers $\{l_1(t), l_2(t), \ldots, l_M(t)\}$, or some combination thereof.

In addition, in these and other embodiments, the adjustment of the energy loads and the energy production of the one or more prosumers may include generating, for one or more of the prosumers at the current time interval, an adjusted value for: a curtailed amount of generation at a pro PV ($\Delta p_i(t)$), a discharge amount from a pro battery ($u_i(t)$), a charge amount from a pro PV to a pro battery ($v_i(t)$), a discharge amount from one or more EV ($x_i(t)$), a charge amount from a pro PV of the prosumer to a connected EV ($y_i(t)$), an amount of energy sent from a pro PV directly to the load ($z_i(t)$), discharge output from one or more pro batteries associated with the prosumer to the electrical grid ($o_i^s(t)$), discharge output from one or more of the EVs associated with the prosumer to the electrical grid ($o_i^e(t)$), discharge output from one or more of the PVs associated with the prosumer to the electrical grid ($o_i^p(t)$), or some combination thereof.

In some embodiments, adjustment of energy supplied from the supply side of the VPP includes receiving as inputs: initial charge levels of supply batteries of the supply side of the VPP $\{b_1(0), b_2(0), \ldots, b_J(0)\}$, forecasted renewable generation for photovoltaic cells of the supply side of the VPP $\{r_1(t), r_2(t), \ldots, r_N(t)\}$, forecasted wind generation for wind turbines of the supply side of the VPP $\{w_1(t), w_2(t), \ldots, w_H(t)\}$, forecasted loads for customers $\{l_1(t), l_2(t), \ldots, l_M(t)\}$, and an adjusted values for $\Delta p_i(t), u_i(t), v_i(t), x_i(t), y_i(t), z_i(t), o_i^s(t), o_i^e(t)$, and $o_i^p(t)$ based on the adjustment of the energy loads and the energy production of the one or more prosumers.

In addition, the adjustment of energy supplied from the supply side may include generating adjusted values for one or more of a charge amount from a supply PV to a supply battery ($q_i(t)$), a curtailment amount of PV generation ($\Delta r_i(t)$), a charge amount from a wind turbine to a supply battery ($\omega_k(t)$), a curtailment amount of wind generation ($\Delta w_k(t)$), a discharge amount from a supply battery to loads ($f_j(t)$), and energy sent from the electrical grid to a load at a prosumer ($o_i^d(t)$), or some combination thereof.

In some embodiments, the adjustment of curtailment of the energy loads in the prosumers includes receiving as inputs one or more of curtailment capacity of the prosumers $\{\overline{l_1}, \overline{l_2}, \ldots, \overline{l_M}\}$, discharging rates of supply batteries for one or more time intervals $\{f_1(t), f_2(t), \ldots, f_J(t)\}$, and updated sets of demands that are based on adjusted energy loads and energy production of the one or more prosumers of the VPP and adjusted energy supplied from the supply side of the VPP $\{d_1(t), d_2(t), \ldots, d_M(t)\}$. Additionally, the adjustment of curtailment of the energy loads may include generating a set of curtailment amounts of loads for one or more of the prosumers and for one or more time intervals ($\Delta l_i(t)$).

Additionally, in some embodiments, to adjust curtailment of the energy loads the adjustment engine 208 may determine whether a total demand is smaller than a DR capacity. For example, in some embodiments, a determination may be performed according to demand/capacity comparison expressions described above.

In response to the total demand to electrical grid 113 being smaller than the DR capacity, the adjustment engine 208 may select a subset of the prosumers 115 to include in the VPP DR event. The selection may be based on one or more of participation likelihood of the prosumers 115 for past DR events or VPP DR events, curtailment capacity and estimation, number of available and occupied resources, a benefits and costs analysis, or some combination thereof. In response to the total demand being greater than the DR capacity, the adjustment engine 208 may include all the prosumers 115 with a capacity amount. Accordingly, a total curtailment may be defined according to a total curtailment expression described above.

At block 508, a VPP DR event schedule may be generated. The VPP DR event schedule may be based on the objective function and/or may be generated by a VPP controller server such as the controller server 106 of FIGS. 1 and 2. The VPP DR event schedule may include a charge/discharge schedule of one or more energy source devices (in FIGS. 1-3B, e.g., 112, 225, 223, 243, 233, 227, 231, 241, and 206) a charge/discharge schedule for one or more energy load devices, and a DR schedule for one or more of the energy source devices and the one or more energy load devices.

At block 510, the VPP DR event schedule may be communicated, by a VPP controller server to one or more VPP client servers. With reference to FIGS. 1 and 2, the controller server 106 may communicate the VPP DR event schedule to the client servers 107. The VPP DR event schedule may include one or more control signals that are configured to affect an operating condition of one or more of the devices that are controlled by the VPP client servers. For example, the VPP DR event schedule may include one or more control signals that are configured to affect an operating condition or transition an operational state of the devices 112 that are controlled by the client servers 107.

At block 512, the control signals may be communicated to the devices 112 to affect an operating condition of the devices in accordance with the VPP DR event schedule. For example, the client servers 107 may communicate the control signals to the devices 112 to affect an operating condition of the devices in accordance with the VPP DR event schedule.

Figure 6A:
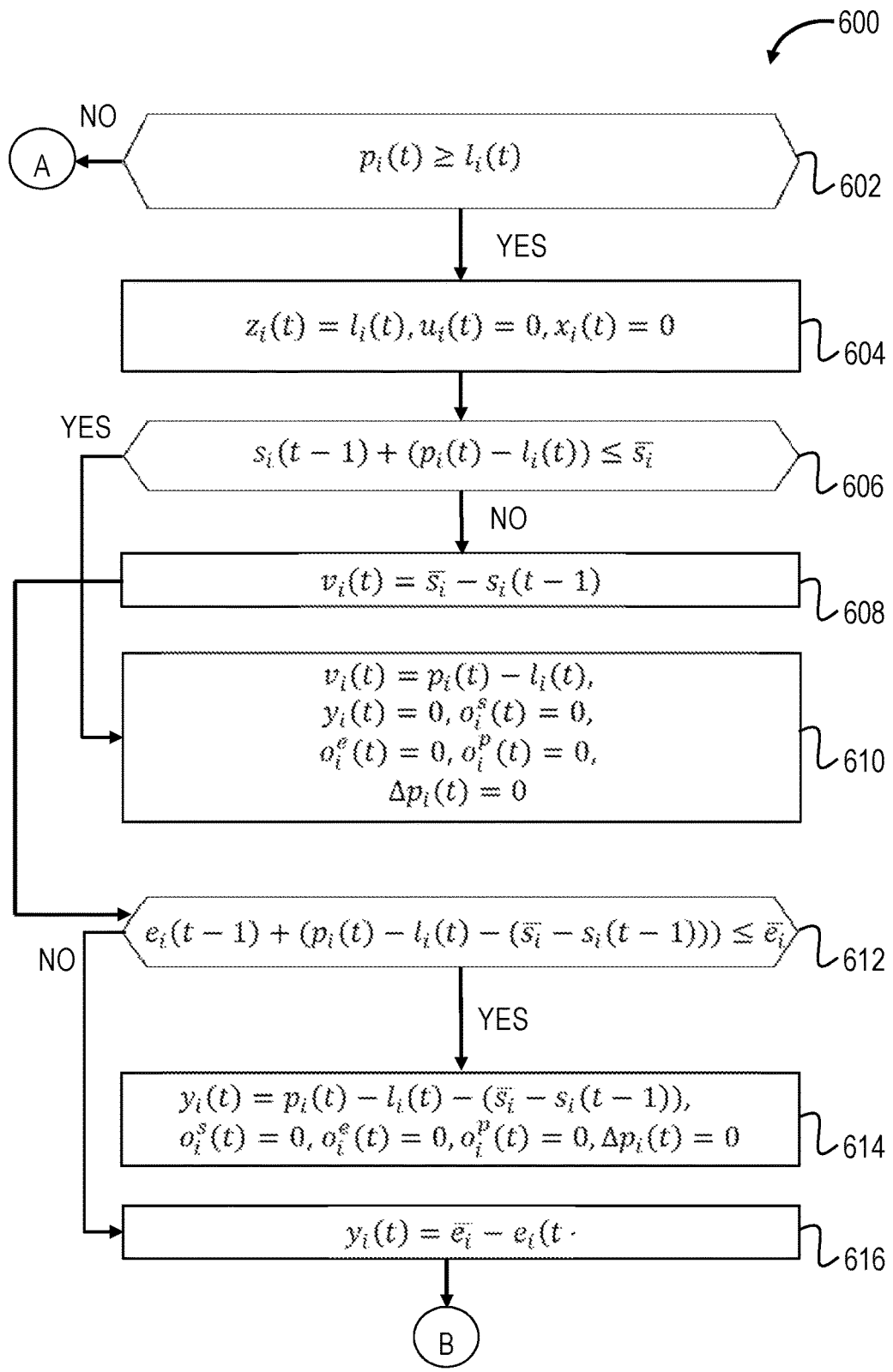
FIGS. 6A-6C are a flow diagram of an example method of adjusting energy loads and energy production of one or more prosumers of a VPP.
Figure 6B:
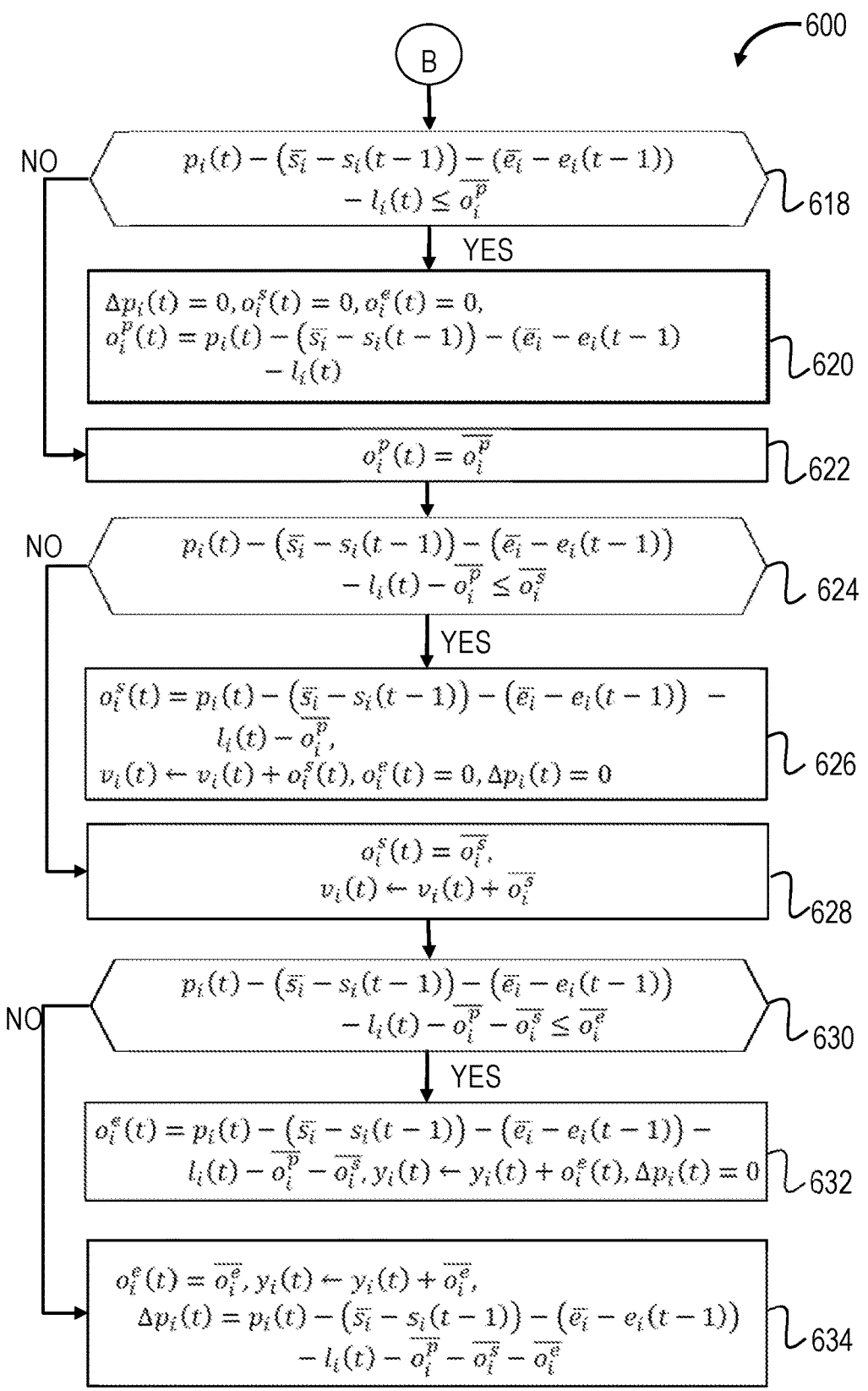
Figure 6C:
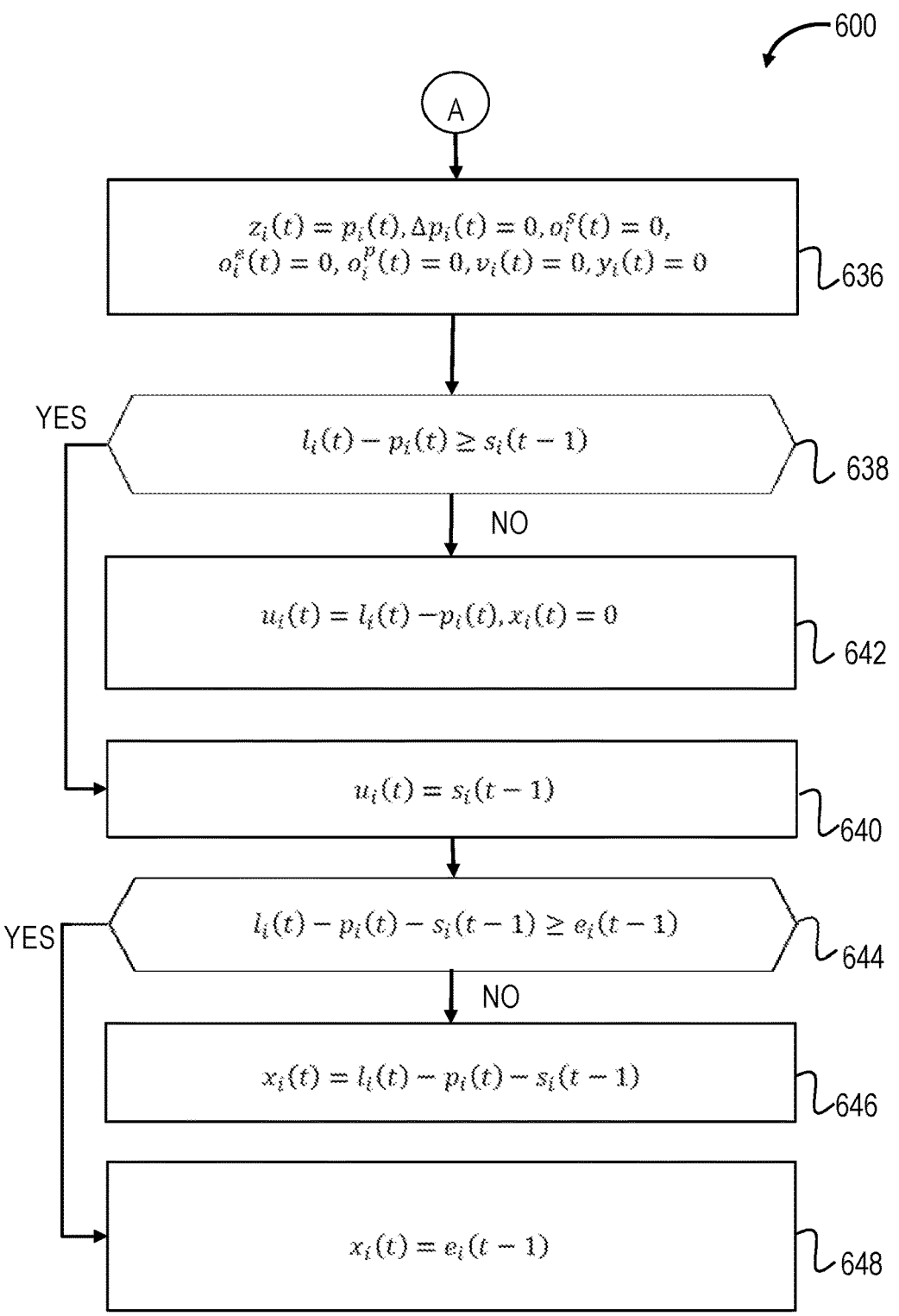

FIGS. 6A-6C are a flow diagram of an example method 600 of adjusting energy loads and energy production of one or more prosumers of a VPP, arranged in accordance with at least one embodiment described herein. The method 600 may be performed in a distribution system such as the distribution system 100 of FIG. 1 in which the utility 104 provides energy to the sites 130. The method 600 may be programmably performed in some embodiments by the controller server 106 described with reference to FIGS. 1 and 2. In some embodiments, the controller server 106 or another computing system may include or may be communicatively coupled to a non-transitory computer-readable medium (e.g., the memory 408 of FIG. 4) having stored thereon programming code or instructions that are executable by one or more processors (such as the processor 404 of FIG. 4) to cause a computing system and/or the controller server 106 to perform or control performance of the method 600. Additionally or alternatively, the controller server 106 may include the processor 404 described above that is configured to execute computer instructions to cause the controller server 106 or another computing system to perform or control performance of the method 600. Although illustrated as discrete blocks, various blocks may be divided into additional blocks, combined into fewer blocks, or eliminated, depending on the desired implementation. The method 600 is described using the notation from the expressions provided elsewhere in this disclosure. In some embodiments, the method 600 may be incorporated in another method described in this disclosure. For example, the method 600 may be included in block 506 of the method 500.

Referring to FIG. 6A, the method 600 may begin at block 602, in which it is determined whether $p_i(t) \geq l_i(t)$. In response to $p_i(t) \geq l_i(t)$ ("YES" at block 602) the method 600 may proceed to block 604. At block 604, the following parameters may be set: $z_i(t) = l_i(t)$, $u_i(t) = 0$, and $x_i(t) = 0$. At block 606, it may be determined whether $s_i(t-1) + (p_i(t) - l_i(t)) \leq \overline{s_i}$.

In response to $s_i(t-1) + (p_i(t) - l_i(t)) \leq \overline{s_i}$ ("YES" at block 606) the method may proceed to block 610. At block 610, the following parameters may be set: $v_i(t) = p_i(t) - l_i(t)$, $y_i(t) = 0$, $o_i^s(t)=0$, $o_i^e(t)=0$, $o_i^p(t)=0$, and $\Delta p_i(t)=0$. In response to $s_i(t-1)+(p_i(t)-l_i(t))>\overline{s_i}$ ("NO" at block 606), the method 600 may proceed to block 608. At block 608, the following parameter may be set $v_i(t)=\overline{s_i}-s_i(t-1)$.

At block 612, it may be determined whether $e_i(t-1)+(p_i(t)-l_i(t)-(\overline{s_i}-s_i(t-1)))\leq\overline{e_i}$. In response to $e_i(t-1)+(p_i(t)-l_i(t)-(\overline{s_i}-s_i(t-1)))\leq\overline{e_i}$ ("YES" at block 612), the method 600 may proceed to block 614. At block 614, the following parameters may be set: $y_i(t)=p_i(t)-l_i(t)-(\overline{s_i}-s_i(t-1))$, $o_i^s(t)=0$, $o_i^e(t)=0$, $o_i^p(t)=0$, and $\Delta p_i(t)=0$.

In response to $e_i(t-1)+(p_i(t)-l_i(t)-(\overline{s_i}-s_i(t-1)))>\overline{e_i}$ ("NO" at block 612, the method may proceed to block 616. At block 616, the following parameter may be set: setting $y_i(t)=\overline{e_i}-e_i(t-1)$. With reference to FIG. 6B, at block 618, it may be determined whether $p_i(t)-(\overline{s_i}-s_i(t-1))-(\overline{e_i}-e_i(t-1))-l_i(t)\leq\overline{o_i^p}$. In response to $p_i(t)-(\overline{s_i}-s_i(t-1))-(\overline{e_i}-e_i(t-1))-l_i(t)\leq\overline{o_i^p}$ ("YES" at block 618), the method 600 may proceed to block 620. At block 620, the following parameters may be set: $\Delta p_i(t)=0$, $o_i^s(t)=0$, $o_i^e(t)=0$, and $o_i^p(t)=p_i(t)-(\overline{s_i}-s_i(t-1))-(\overline{e_i}-e_i(t-1))-l_i(t)$.

In response to $p_i(t)-(\overline{s_i}-s_i(t-1))-(\overline{e_i}-e_i(t-1))-l_i(t)>\overline{o_i^p}$ ("NO" at block 618), the method 600 may proceed to block 622. At block 622, the following parameters may be set: $o_i^p(t)=\overline{o_i^p}$. At block 624, it may be determined whether $p_i(t)-(\overline{s_i}-s_i(t-1))-(\overline{e_i}-e_i(t-1))-l_i(t)-\overline{o_i^p}\leq\overline{o_i^s}$. In response to $p_i(t)-(\overline{s_i}-s_i(t-1))-(\overline{e_i}-e_i(t-1))-l_i(t)-\overline{o_i^p}\leq\overline{o_i^s}$ ("YES" at block 624), the method 600 may proceed to block 626. At block 626, the following parameters may be set: $o_i^s(t)=p_i(t)-(\overline{s_i}-s_i(t-1))-(\overline{e_i}-e_i(t-1))-l_i(t)-\overline{o_i^p}$, $v_i(t)\leftarrow v_i(t)+o_i^s(t)$, and $o_i^e(t)=0$, $\Delta p_i(t)=0$.

In response to $p_i(t)-(\overline{s_i}-s_i(t-1))-(\overline{e_i}-e_i(t-1))-l_i(t)-\overline{o_i^p}>\overline{o_i^s}$ ("NO" at block 624), the method 600 may proceed to block 628. At block 628, the following parameters may be set: $o_i^s(t)=\overline{o_i^s}$ and $v_i(t)\leftarrow v_i(t)+\overline{o_i^s}$. At block 630, it may be determined whether $p_i(t)-(\overline{s_i}-s_i(t-1))-(\overline{e_i}-e_i(t-1))-l_i(t)-\overline{o_i^p}-\overline{o_i^s}\leq\overline{o_i^e}$. In response to $p_i(t)-(\overline{s_i}-s_i(t-1))-(\overline{e_i}-e_i(t-1))-l_i(t)-\overline{o_i^p}-\overline{o_i^s}\leq\overline{o_i^e}$ ("YES" at block 630), the method 600 may proceed to block 632. At block 632, the following parameters may be set: $o_i^e(t)=p_i(t)-(\overline{s_i}-s_i(t-1))-(\overline{e_i}-e_i(t-1))-l_i(t)-\overline{o_i^p}-\overline{o_i^s}$ and $y_i(t)\leftarrow y_i(t)+o_i^e(t)$, $\Delta p_i(t)=0$. In response to $p_i(t)-(\overline{s_i}-s_i(t-1))-(\overline{e_i}-e_i(t-1))-l_i(t)-\overline{o_i^p}-\overline{o_i^s}>\overline{o_i^e}$ ("NO" at block 630), the method may proceed to block 634. At block 634, the following parameters may be set: $o_i^e(t)=\overline{o_i^e}$, $y_i(t)\leftarrow y_i(t)+\overline{o_i^e}$ and $\Delta p_i(t)=p_i(t)-(\overline{s_i}-s_i(t-1))-(\overline{e_i}-e_i(t-1))-l_i(t)-\overline{o_i^p}-\overline{o_i^s}-\overline{o_i^e}$.

Referring back to FIG. 6A, in response to $p_i(t)<l_i(t)$ ("NO" at block 602), the method may proceed to block 636. Referring to FIG. 6C, at block 636, the following parameters may be set: $z_i(t)=p_i(t)$, $\Delta p_i(t)=0$, $o_i^s(t)=0$, $o_i^e(t)=0$, $o_i^p(t)=0$, $v_i(t)=0$, and $y_i(t)=0$. At block 638, it may be determined whether $l_i(t)-p_i(t)\geq s_i(t-1)$. In response to $l_i(t)-p_i(t)<s_i(t-1)$ ("NO" at block 638), the method 600 may proceed to block 642. At block 642, the following parameters may be set: $u_i(t)=l_i(t)-p_i(t)$ and $x_i(t)=0$. In response to $l_i(t)-p_i(t)\geq s_i(t-1)$ ("YES" at block 638), the method 600 may proceed to block 640. At block 640, the following parameter may be set: $u_i(t)=s_i(t-1)$.

At block 644, it may be determined whether $l_i(t)-p_i(t)-s_i(t-1)\geq e_i(t-1)$. In response to $l_i(t)-p_i(t)-s_i(t-1)\geq e_i(t-1)$ ("YES" at block 644), the method 600 may proceed to block 648. At block 648, the following parameter may be set: $x_i(t)=e_i(t-1)$. In response to $l_i(t)-p_i(t)-s_i(t-1)<e_i(t-1)$ ("NO" at block 644), the method 600 may proceed to block 646. At block 646, the following parameter may be set: $x_i(t)=l_i(t)-p_i(t)-s_i(t-1)$.

Figure 7A:
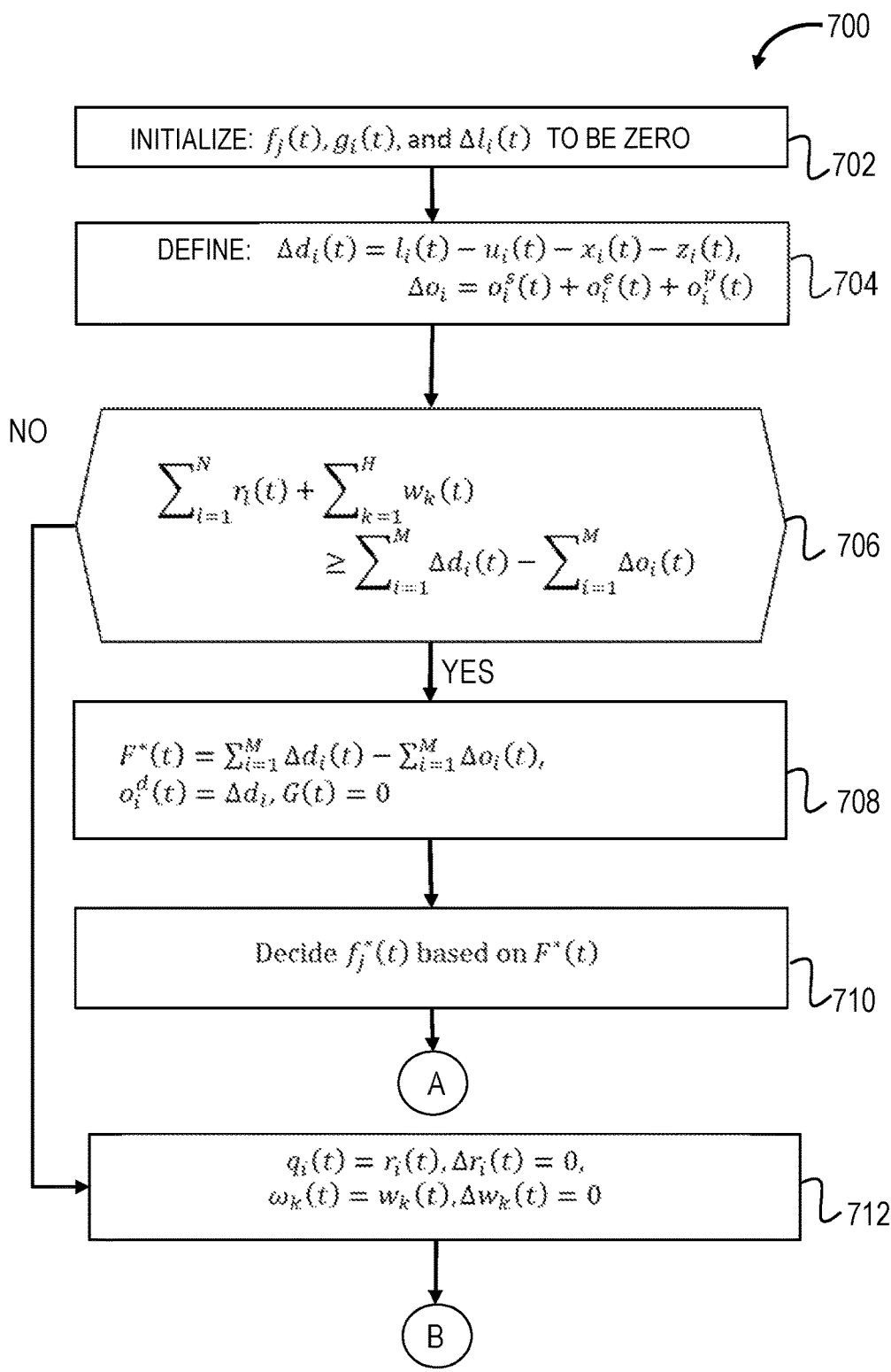
FIGS. 7A-7D are a flow diagram of an example method of adjusting an energy amount supplied from a supply side of a VPP for one or more time intervals, all arranged in accordance with at least one embodiment described herein.
Figure 7B:
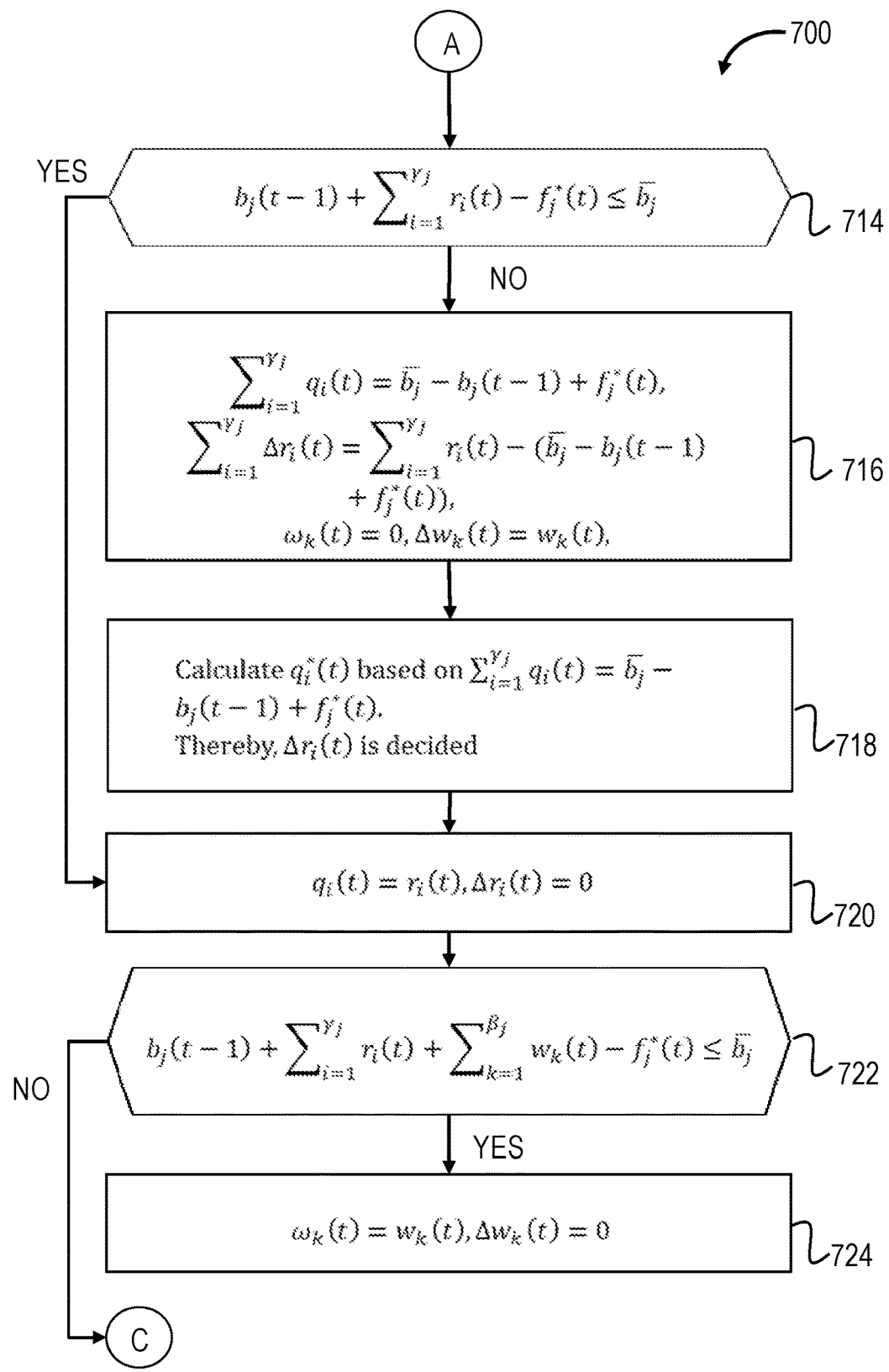
Figure 7C:
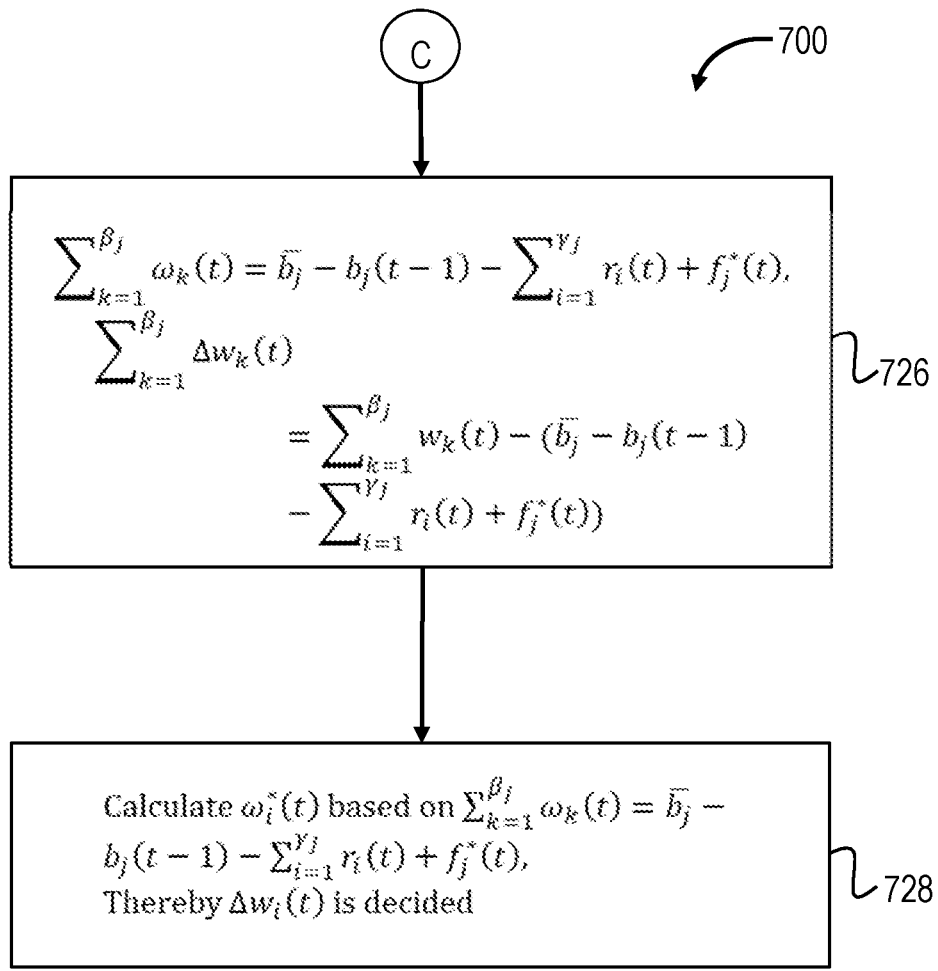

FIGS. 7A-7C are a flow diagram of an example method 700 of adjusting an energy amount supplied from a supply side of a VPP for one or more time intervals, arranged in accordance with at least one embodiment described herein. The method 700 may be performed in a distribution system such as the distribution system 100 of FIG. 1 in which the utility 104 provides energy to the sites 130. The method 700 may be programmably performed in some embodiments by the controller server 106 described with reference to FIGS. 1 and 2. In some embodiments, the controller server 106 or another computing system may include or may be communicatively coupled to a non-transitory computer-readable medium (e.g., the memory 408 of FIG. 4) having stored thereon programming code or instructions that are executable by one or more processors (such as the processor 404 of FIG. 4) to cause a computing system and/or the controller server 106 to perform or control performance of the method 700. Additionally or alternatively, the controller server 106 may include the processor 404 described above that is configured to execute computer instructions to cause the controller server 106 or another computing system to perform or control performance of the method 700. Although illustrated as discrete blocks, various blocks may be divided into additional blocks, combined into fewer blocks, or eliminated, depending on the desired implementation. The method 600 is described using the notation from the expressions provided elsewhere in this disclosure. In some embodiments, the method 700 may be incorporated in another method described in this disclosure. For example, the method 700 may be included in block 506 of the method 500.

Referring to FIG. 7A, the method 700 may begin at block 702 in which $f_j(t)$, $g_i(t)$, and $\Delta l_i(t)$ may be initialed to be 0. At block 704, $\Delta d_i(t)=l_i(t)-u_i(t)-x_i(t)-z_i(t)$ and $\Delta o_i=o_i^s(t)+o_i^e(t)+o_i^p(t)$ may be defined. In some embodiments, the $\Delta d_i(t)=l_i(t)-u_i(t)-x_i(t)-z_i(t)$ and $\Delta o_i=o_i^s(t)+o_i^e(t)+o_i^p(t)$ may be based on adjusted energy loads and energy production of one or more prosumers of the VPP. For example, the adjusted energy loads and energy production may result from implementation of the method 600.

At block 706, it may be determined whether $\Sigma_{l=1}^N r_l(t)+\Sigma_{k=1}^H w_k(t)\geq \Sigma_{i=1}^M \Delta d_i(t)-\Sigma_{i=1}^M o_i(t)$. In response to $\Sigma_{l=1}^M r_l(t)+\Sigma_{k=1}^M w_k(t)\geq \Sigma_{i=1}^M \Delta d_i(t)-\Sigma_{i=1}^M \Delta o_i(t)$ ("YES" at block 706), the method 700 may proceed to block 708. At block 708, the following parameters may be set: $F^*(t)=\Sigma_{i=1}^M \Delta d_i(t)-\Sigma_{i=1}^M \Delta o_i(t)$, $o_i^d(t)=\Delta d_i$, and $G(t)=0$. At block 710, $f_j^*(t)$ may be decided based on $F^*(t)$.

Referring to FIG. 7B, at block 714 it may be determined whether $b_j(t-1)+\Sigma_{i=1}^{v_j} r_i(t)-f_j^*(t)\leq \overline{b_j}$. In response to $b_j(t-1)+\Sigma_{i=1}^{v_j} r_i(t)-f_j^*(t)\leq \overline{b_j}$ ("YES" at block 714), the method 700 may proceed to block 720. At block 720, the following parameters may be set: $q_i(t)=r_i(t)$, $\Delta r_i(t)=0$. At block 722, it may be determined whether $b_j(t-1)+\Sigma_{i=1}^{v_j} r_i(t)+\Sigma_{k=1}^{\beta_j} w_k(t)-f_j^*(t)\leq \overline{b_j}$. In response to $b_j(t-1)+\Sigma_{i=1}^{v_j} r_i(t)+\Sigma_{k=1}^{\beta_j} w_k(t)-f_j^*(t)\leq \overline{b_j}$ ("YES" at block 722), the method 700 may proceed to block 724. At block 724, the following parameter may be set: $\omega_k(t)=w_k(t)$, $\Delta w_k(t)=0$. In response to $b_j(t-1)+\Sigma_{i=1}^{v_j} r_i(t)+\Sigma_{k=1}^{\beta_j} w_k(t)-f_j^*(t)>\overline{b_j}$ ("NO" at block 722), the method 700 may proceed to block 726 of FIG. 7C. With reference to block 726 of FIG. 7C, the following parameters may be set: $\Sigma_{k=1}^{\beta_j} \omega_k(t)=\overline{b_j}-b_j(t-1)-\Sigma_{i=1}^{v_j} r_i(t)+f_j^*(t)$ and $\Sigma_{k=1}^{\beta_j} \Delta w_k(t)=\Sigma\Sigma_{k=1}^{\beta_j} w_k(t)-(\overline{b_j}-b_j(t-1)-\Sigma_{i=1}^{v_j} r_i(t)+f_j^*(t))$. At block 728, $\omega_i^*(t)$ may be calculated based on $\Sigma_{k=1}^{\beta_j} \omega_k(t)=\overline{b_j}-b_j(t-1)-\Sigma_{i=1}^{v_j} r_i(t)+f_j^*(t)$.

Referring back to FIG. 7B, in response to $b_j(t-1)+\Sigma_{i=1}^{v_j} r_i(t)-f_j^*(t)>\overline{b_j}$, ("NO" at block 714), the method 700 may proceed to block 716. At block 716, the following parameters may be set: $\Sigma_{i=1}^{v_{ij}}q_i(t)=\bar{b}_j-b_j(t-1)+f_j*(t)$, $\Sigma_{i=1}^{v_{ij}}\Delta r_i(t)=\Sigma_{i=1}^{v_{ij}}r_i(t)-(\bar{b}_j-b_j(t-1)+f_j*(t))$, and $\omega_k(t)=$, $\Delta w_k(t)=w_k(t)$. At block 718 $q_i*(t)$ may be calculated based on $\Sigma_{i=1}^{v_{ij}}q_i(t)=\bar{b}_j-b_j(t-1)+f_j*(t)$.

Figure 7D:
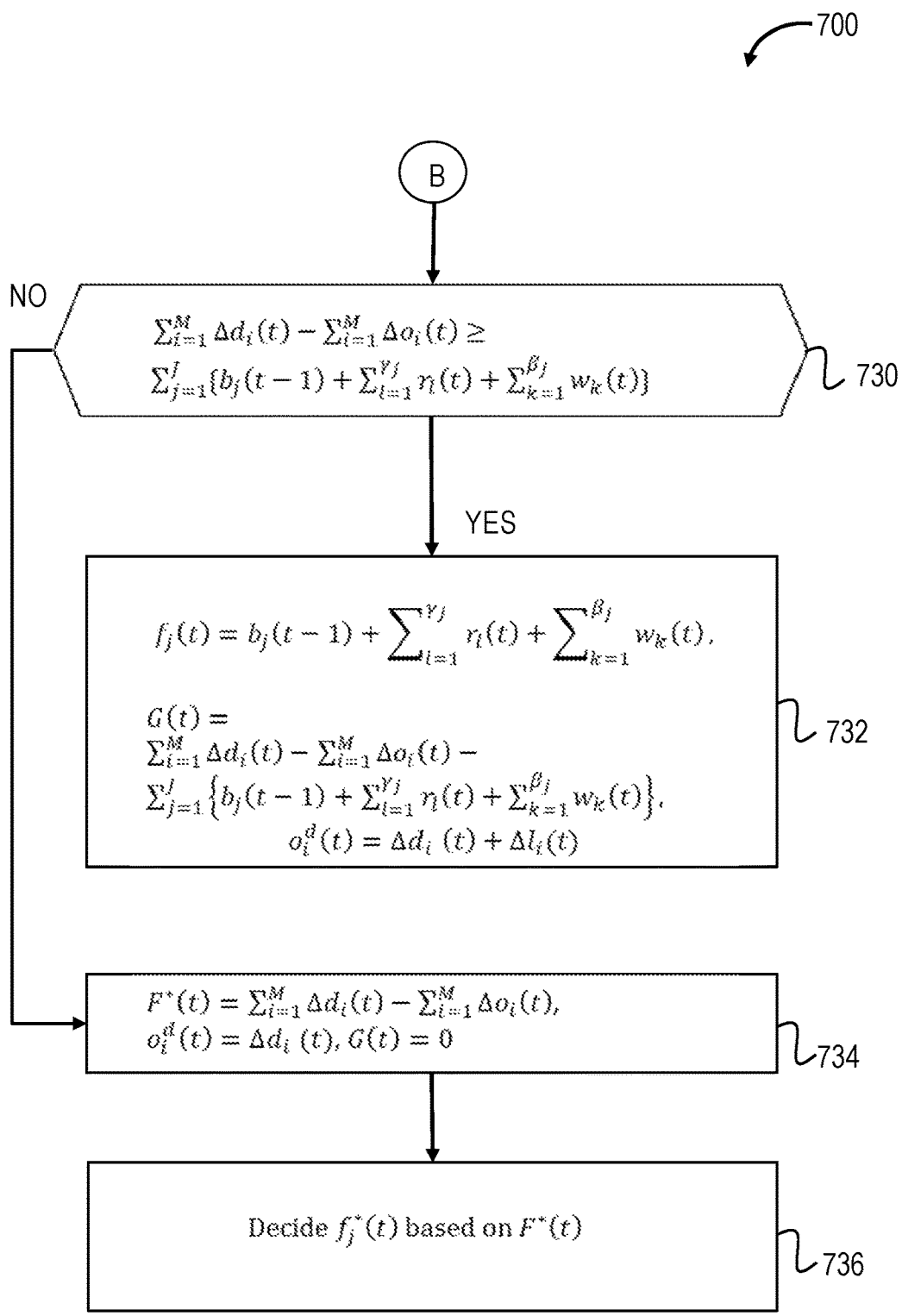

Referring back to FIG. 7A, in response to $\Sigma_{l=1}^{N}r_l(t)+\Sigma_{k=1}^{H}w_k(t)<\Sigma_{i=1}^{M}\Delta d_i(t)-\Sigma_{i=1}^{M}\Delta o_i(t)$ ("NO" at block 706), the method 700 may proceed to block 712. At block 712, the following parameters may be set: $q_i(t)=r_i(t)$, $\Delta r_i(t)=0$, $\omega_k(t)=w_k(t)$, and $\Delta w_k(t)=0$. Referring to FIG. 7D, at block 730 it may be determined whether $\Sigma_{i=1}^{M}\Delta d_i(t)-\Sigma_{i=1}^{M}\Delta o_i(t)\geq\Sigma_{j=1}^{J}\{b_j(t-1)+\Sigma_{l=1}^{v_{ij}}r_l(t)+\Sigma_{k=1}^{\beta_{ij}}w_k(t)\}$. In response to $\Sigma_{i=1}^{M}\Delta d_i(t)-\Sigma_{i=1}^{M}\Delta o_i(t)\geq\Sigma_{j=1}^{J}\{b_j(t-1)+\Sigma_{l=1}^{v_{ij}}r_l(t)+\Sigma_{k=1}^{\beta_{ij}}w_k(t)\}$ ("YES" at block 730) the method 700 may proceed to block 732. At block 732, the following parameters may be set: $f_j(t)=b_j(t-1)+\Sigma_{l=1}^{v_{ij}}r_l(t)+\Sigma_{k=1}^{\beta_{ij}}w_k(t)$, $G(t)=\Sigma_{i=1}^{M}\Delta d_i(t)-\Sigma_{i=1}^{M}\Delta o_i(t)-\Sigma_{j=1}^{J}\{b_j(t-1)+\Sigma_{l=1}^{v_{ij}}r_l(t)+\Sigma_{k=1}^{\beta_{ij}}w_k(t)\}$, and $o_i^d(t)=\Delta d_i(t)+\Delta l_i(t)$. In response to $\Sigma_{i=1}^{M}\Delta d_i(t)-\Sigma_{i=1}^{M}\Delta o_i(t)<\Sigma_{j=1}^{J}\{b_j(t-1)+\Sigma_{l=1}^{v_{ij}}r_l(t)+\Sigma_{k=1}^{\beta_{ij}}w_k(t)\}$ ("NO" at block 730), the method may proceed to block 734. At block 734, the following parameters may be set: $F*(t)=\Sigma_{i=1}^{M}\Delta d_i(t)-\Sigma_{i=1}^{M}\Delta o_i(t)$ and $o_i^d(t)=\Delta d_i(t)$, $G(t)=0$. At block 736, $f_j*(t)$ may be decided based on $F*(t)$.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data, which cause a general-purpose computer, special-purpose computer, or special-purpose processing resource to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module," "component," and/or "engine" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method of aggregated virtual power plant (VPP) control, the method comprising:

receiving, at a VPP controller server of a VPP, one or more control variable values from a previous time interval for a plurality of control variables, the plurality of control variables being related to energy production and energy loads of devices that are electrically coupled to an electrical grid and communicatively coupled to the VPP controller server;

inputting, at the VPP controller server, the control variable values into an objective algorithm, the objective algorithm being configured to increase a contribution of renewable energy production to serve a demand and integration of energy source devices communicatively coupled to the VPP controller server and to reduce energy generation and integration of energy produced by a utility;

executing, by the VPP controller server, the objective algorithm, the executing the objective algorithm includes adjusting energy loads and energy production of one or more prosumers of the VPP, adjusting an energy amount supplied from a supply side of the VPP for one or more time intervals, and adjusting curtailment of the energy loads in the prosumers based on an adjusted energy supplied from the supply side of the VPP and adjusted energy loads and energy production of the one or more prosumers, the adjusting curtailment of the energy loads in the prosumers includes generating a set of curtailment amounts of loads for each of the prosumers and for each time interval (Al(t)), determining whether a total demand that is not covered by the renewable resource is smaller than a DR capacity, and in response to the total demand being smaller than the DR capacity, conducting a prosumer selection based on one or more or a combination of: participation likelihood of each prosumer for past DR events, curtailment capacity and estimation, a number of available and occupied resources, and a benefits and costs analysis;

based on the objective function, generating, at the VPP controller server, a VPP demand response (DR) event schedule that includes a charge/discharge schedule of one or more energy source devices and a charge/discharge schedule for one or more energy load devices; and communicating in real time, by the VPP controller server, the VPP DR event schedule to one or more VPP client servers, the VPP DR event schedule including control signals that are configured to affect an operating condition of one or more of the devices that are controlled by the VPP client servers.

2. The method of claim 1, further comprising communicating the control signals to the devices to affect an operating condition of the devices in accordance with the VPP DR event schedule.

3. The method of claim 1, wherein:
the control variable values include:
  initial energy levels of electric vehicles (EV) of the one or more prosumers $\{e_1(0), e_2(0), \ldots, e_M(0)\}$,
  initial energy levels of stationary batteries of the one or more prosumers (pro batteries) $\{s_1(0), s_2(0), \ldots, s_M(0)\}$,
  forecasted photovoltaic (PV) production for a current time interval for each PV associated with each of the prosumers (pro PV) $\{p_1(t), p_2(t), \ldots, p_M(t)\}$, and
  forecasted loads for the current time interval for each of the prosumers $\{l_1(t), l_2(t), \ldots, l_M(t)\}$; and
the adjusting the energy loads and the energy production of the one or more prosumers includes:
  receiving the control variable values as inputs; and
  generating for each of the prosumers at the current time interval an adjusted value for:
    a curtailed amount of PV generation ($\Delta p_i(t)$);
    a discharge amount from a pro battery ($u_i(t)$),
    a charge amount from a pro PV to a pro battery ($v_i(t)$),
    a discharge amount from one or more EVs ($x_i(t)$),
    a charge amount from a pro PV to a connected EV ($y_i(t)$),
    an amount of energy sent from a pro PV directly to the load ($z_i(t)$),
    discharge output from one or more pro batteries to the electrical grid ($o_i^s(t)$),
    discharge output from one or more of the EVs associated with the prosumer to the electrical grid ($o_i^e(t)$), and
    discharge output from one or more of the pro PVs to the electrical grid ($o_i^p(t)$),
    in which:
      t represents the current time interval,
      M represents a number of prosumers, and
      i is an indexing variable that ranges from 1 to M.

4. The method of claim 3, wherein the adjusting the energy loads and the energy production of the one or more prosumers further includes:
determining whether $p_i(t) \geq l_i(t)$;
in response to $p_i(t) \geq l_i(t)$:
  setting:

$z_i(t)=l_i(t)$, $u_i(t)=0$, and $x_i(t)=0$; and determining whether $s_i(t-1)+(p_i(t)-l_i(t)) \leq \overline{s_i}$;
  in response to $s_i(t-1)+(p_i(t)-l_i(t)) \leq \overline{s_i}$;
    setting:

$v_i(t)=p_i(t)-l_i(t)$, $y_i(t)=0$, $o_i^s(t)=0$, $o_i^p(t)=0$, and $\Delta p_i(t)=0$;

in response to $s_i(t-1)+(p_i(t)-l_i(t)) \geq \overline{s_i}$:
    setting $v_i(t)=\overline{s_i}-s_i(t-1)$, and
    determining whether $e_i(t-1)+(p_i(t)-l_i(t)-(\overline{s_k}-s_i(t-1))) \leq \overline{e_i}$;
  and
  in response to $e_i(t-1)+(p_i(t)-l_i(t)-(\overline{s_i}-s_i(t-1))) \leq \overline{e_i}$,
    setting:

$y_i(t)=p_i(t)-l_i(t)-(\overline{s_1}-s_i(t-1))$, $o_i^s(t)=0$, $o_i^e(t)=0$, $o_i^p(t)=0$, and $\Delta p_i(t)=0$, in which:
    $v_i(\ )$ represents a charge amount from a pro PV to a pro battery;
    $l_i(\ )$ represents a load at one of the prosumers;
    $s_i(\ )$ represents an energy level of a pro battery at t;
    t−1 represents a previous time interval;
    $x_i(\ )$ represents a discharge amount from one or more EVs;
    $y_i(\ )$ represents a charge amount from a pro PV of the prosumer to a connected EV;
    $p_i(\ )$ represents a forecasted PV production;
    $\overline{\phantom{x}}$ represents a maximum capacity of a parameter;
    $o_i^s(\ )$ represents discharge output from one or more pro batteries to the electrical grid;
    $o_i^p(\ )$ represents discharge output from one or more of the pro PVs to the electrical grid;
    $o_i^e(\ )$ represents a discharge output from one or more of the EVs associated with the prosumer to the electrical grid;
    $\Delta p_i(\ )$ represents a curtailed amount of PV generation; and
    $e_i(\ )$ represents energy levels of an EV.

5. The method of claim 4, wherein the adjusting the energy loads and the energy production of the one or more prosumers includes:
in response to $e_i(t-1)+(p_i)-l_i(t)-(\overline{s_i}-s_i(t-1)))>\overline{e_i}$:

setting $y_i(t)=\overline{e_i}-e_i(t-1)$;
determining whether $p_i(t)-(\overline{s_i}-s_i(t-1))-(\overline{e_i}-e_i(t-1))-l_i(t) \leq \overline{o_i^p}$;
in response to $p(t)-(\overline{s_i}-s_i(t-1))-(\overline{e_i}-e_i(t-1))-l_i(t) \leq \overline{o_i^p}$,
  setting:

$\Delta p_i(t)=0$, $o_i^s(t)=0$, $o_i^e(t)=0$, $o_i^p(t)=p_i(t)-(\overline{s_i}-s_i(t-1))-(\overline{e_i}-e_i(t-1))-l_i(t)$;

in response to $p_i(t)-(\overline{s_i}-s_i(t-1))-(\overline{e_i}-e_i(t-1))-l_i(t)>\overline{o_i^p}$;

setting $o_i^p(t)=\overline{o_i^p}$; and
determining whether $p_i(t)-(\overline{s_i}-s_i(t-1))-(\overline{e_i}-e_i(t-1))-l_i(t)-\overline{o_i^p} \leq \overline{o_i^s}$;

in response to $p_i(t)-(\overline{s_i}-s_i(t-1))-(\overline{e_i}-e_i(t-1))-l_i(t)-\overline{o_i^p} \leq \overline{o_i^s}$, setting:

$o_i^s(t)=p_i(t)-(\overline{s_i}-s_i(t-1))-(\overline{e_i}-e_i(t-1))-l_i(t)-\overline{o_i^p}$, $v_i(t) \leftarrow v_i(t)+o_i^s(t)$, and $o_i^s(t)=0, \Delta p_i(t)=0$;

in response to $p_i(t)-(\overline{s_i}-s_i(t-1))-(\overline{e_i}-e_i(t-1))-l_i(t)-\overline{o_i^p}>\overline{o_i^s}$:

setting:

$o_i^s(t)=\overline{o_i^s}$, and $v_i(t) \leftarrow v_i(t)+\overline{o_i^s}$; and determining whether $p_i(t)-(\overline{s_i}-s_i(t-1))-(\overline{e_i}-e_i(t-1))-l_i(t)-\overline{o_i^p}-\overline{o_i^s} \leq \overline{o_i^e}$;

in response to $p_i(t)-(\overline{s_i}-s_i(t-1))-(\overline{e_i}-e_i(t-1))-l_i(t)-\overline{o_i^p}-\overline{o_i^s} \leq \overline{o_i^e}$, setting:

$o_i^e(t)=$ $p_i(t)-(\overline{s_i}-s_i(t-1))-(\overline{e_i}-e_i(t-1))-l_i(t)-\overline{o_i^p}-\overline{o_i^s}$, and $y_i(t) \leftarrow y_i(t)+o_i^s(t), \Delta p_i(t)=0$; and in response to $p_i(t)-(\overline{s_i}-s_i(t-1))-(\overline{e_i}-e_i(t-1))-l_i(t)-\overline{o_i^p}-\overline{o_i^s} \leq \overline{o_i^e}$, setting:

$o_i^s(t)=\overline{o_i^s}, y_i(t) \leftarrow y_i(t)+\overline{o_i^s}$, and $\Delta p_i(t)$ $=p_i(t)-(\overline{s_i}-s_i(t-1))-(\overline{e_i}-e_i(t-1))-l_i(t)-\overline{o_i^p}-\overline{o_i^s}-\overline{o_i^s}$.

6. The method of claim 5, wherein the adjusting the energy loads and the energy production of the one or more prosumers includes:

in response to $p_i(t)<l_i(t)$
setting:

$z_i(t)=p_i(t)$, $\Delta p_i(t)=0$, $o_i^s(t)=0$, $o_i^e(t)=0$ $o_i^p(t)=0$, $v_i(t)=0$, and $y_i(t)=0$; and determining whether $l_i(t)-p_i(t) \geq s_i(t-1)$;
in response to $l_i(t)-p_i(t)<s_i(t-1)$, setting:

$u_i(t)=l_i(t)-p_i(t)$, and $x_i(t)=0$;

in response to $l_i(t)-p_i(t) \geq s_i(t-1)$,
setting $u_i(t)=s_i(t-1)$;
determining whether $l_i(t)-p_i(t)-s_i(t-1) \geq e_i(t-1)$;
in response to $l_i(t)-p_i(t)-s_i(t-1) \geq e_i(t-1)$, setting $x_i(t)=e_i(t-1)$;

in response to $l_i(t)-p_i(t)-s_i(t-1)<e_i(t-1)$, setting $x_i(t)=l_i(t)-p_i(t)-s_i(t-1)$.

7. The method of claim 3, wherein:
the control variable values include:
initial charge levels of supply-side batteries of the supply side of the VPP $\{b_1(0), b_2(0), \ldots, b_J(0)\}$;
forecasted renewable generation for photovoltaic cells of the supply side of the VPP (supply PVs) $\{r_1(t), r_2(t), \ldots, r_N(t)\}$;
forecasted wind generation for wind turbines of the supply side of the VPP $\{w_1(t), w_2(t), \ldots, w_H(t)\}$; and
forecasted loads for prosumers $\{l_1(t), l_2(t), \ldots, l_M(t)\}$; and
an adjusted value for $\Delta p_i(t)$, $u_i(t)$, $v_i(t)$, $x_i(t)$, $y_i(t)$, $z_i(t)$, $o_i^s(t)$, $o_i^e(t)$, and $o_i^p(t)$; and
adjusting energy supplied from the supply side of the VPP includes:
receiving the control variable values as inputs; and
generating adjusted values for:
a charge amount from a supply PV to a supply-side battery ($q_i(t)$);
a curtailment amount of PV generation ($\Delta r_g(t)$);
a charge amount from a wind turbine to a supply-side battery ($w_k(t)$);
a curtailment amount of wind generation ($\Delta w_k(t)$);
a discharge amount from a supply-side battery to loads ($f_j(t)$); and
energy sent from the electrical grid to a load at a prosumer ($o_i^d(t)$),
in which:
H represents the number of wind turbines in the supply side;
N represents the number of supply PVs in the supply side;
J represents the number of supply-side batteries;
k represents an indexing variable for the wind turbines with a range from 1 to H;
j represents an indexing variable for the supply-side batteries with a range from 1 to J;
i represents an indexing variable for the supply PVs with a range from 1 to N.

8. The method of claim 7, wherein adjusting energy supplied from the supply side of the VPP includes:
initializing $f_j(t)$, $g_i(t)$, and $\Delta l_i(t)$ to be zero;
defining $\Delta d_i(t)=l_i(t)-u_i(t)-x_i(t)-z_i(t)$ and $\Delta o_i=o_i^s(t)+o_i^e(t)+o_i^p(t)$, based on the results from the adjusting energy loads and energy production of one or more prosumers of the VPP;
determining whether $\Sigma_{i=1}^N r_i(t)+\Sigma_{k=1}^H w_k(t) \geq \Sigma_{i=1}^M \Delta d_i(t)-\Sigma_{i=1}^M = \Delta o_i(t)$;
in response to $\Sigma_{i=1}^N r_i(t)+\Sigma_{k=1}^H = w_k(t) \geq \Sigma_{i=1}^M \Delta d_i(t)-\Sigma_{i=1}^M \Delta o_i(t)$:
setting:

$F^+(t)=\Sigma_{i=1}^M \Delta d_i(t)-\Sigma_{i=1}^M = \Delta o_i(t)$, $o_i^d(t)=\Delta d_i$, and $G(t)=0$;

deciding $f^*_j(t)$ based on $F^+(t)$;
determining whether $b_j(t-1)+\Sigma_{i=1}^{v_j} r_i(t)-f^*_j(t) \leq \overline{b_j}$;
in response to $b_j(t-1)+\Sigma_{i=1}^{v_j} r_i(t)-f^*_j(t) \leq \overline{b_j}$:
setting $q_s(t)=r_i(t)$, $\Delta r_i(t)=0$;
determining whether $b_j(t-1)+\Sigma_{i=1}^{v_j} r_i(t)+\Sigma_{k=1}^{\beta_j} w_k(t)-f^*_j(t) \leq \overline{b_j}$;
in response to $b_j(t-1)+\Sigma_{i=1}^{v_j} r_i(t)+\Sigma_{k=1}^{\beta_j} w_k(t)-f^*_j(t) \leq \overline{b_j}$, setting $w_k(t)=w_k(t)$, $\Delta w_k(t)=0$;
in response to $b_j(t-1)+\Sigma_{i=1}^{v_j} r_i(t)+\Sigma_{k=1}^{v_j} w_k(t)-f^*_j(t)>\overline{b_j}$:

setting:

$\sum_{k=1}^{\beta j} \omega_k(t) = \overline{b}_j - b_j(t-1) - \sum_{i=1}^{\nu j} r_i(t) + f^*_j(t)$, and $\sum_{k=1}^{\beta j} \Delta w_k(t) = \sum_{k=1}^{\beta j} w_k(t) - (\overline{b}_j - b_j(t-1) - \beta_{i=1}^{\nu j} r_i(t) + f^*_j(t))$;

and
calculating $\omega^*_i(t)$ based on $\sum_{k=1}^{\beta j} \omega_k(t) = \overline{b}_j - b_j(t-1) - \sum_{i=1}^{\nu j} r_i(t) + f^*_j(t)$;

in response to $b_j(t-1) + \sum_{i=1}^{\nu j} r_i(t) + \sum_{k=1}^{\beta j} w_k(t) - f^*_j(t) > \overline{b}_j$:

setting:

$\sum_{i=1}^{\nu j} q_i(t) = \overline{b}_j - b_j(t-1) + f^*_j(t)$, $\sum_{i=1}^{\nu j} \Delta r_i(t) = \sum_{i=1}^{\nu j} r_i(t) - (\overline{b}_j - b_j(t-1) + f^*_j(t))$, and $\omega_k(t) = 0, \Delta w_k(t) = w_k(t)$; and
calculating $q^*_i(t)$ based on $\sum_{i=1}^{\nu j} q_i(t) = \overline{b}_j - b_j(t-1) + f^*_j(t)$.

9. The method of claim 8, wherein adjusting energy supplied from the supply side of the VPP includes:
in response to $\sum_{i=1}^{N} r_i(t) + \sum_{k=1}^{H} w_k(t) \leq \sum_{i=1}^{M} \Delta d_i(t) - \sum_{i=1}^{M} \Delta o_i(t)$:
setting:

$q_i(t) = r_i(t)$, $\Delta r_i(t) = 0$, $\omega_k(t) = w_k(t)$, and $\Delta w_k(t) = 0$;
determining whether $\sum_{i=1}^{M} \Delta d_i(t) - \sum_{i=1}^{M} \Delta o_i(t) \geq \sum_{j=1}^{J} \{b_j(t-1) + \sum_{i=1}^{\nu j} r_i(t) \times \sum_{k=1}^{\beta j} w_k(t)\}$;

in response to $\sum_{i=1}^{M} \Delta d_i(t) - \sum_{i=1}^{M} \Delta o_s(t) \geq \sum_{j=1}^{J} \{b_j(t-1) + \sum_{i=1}^{\nu j} r_i(t) + \sum_{k=1}^{\beta j} w_k(t)\}$, setting:

$f_j(t) = b_j(t-1) + \sum_{i=1}^{\nu j} r_i(t) + \sum_{k=1}^{\beta j} w_k(t)$, $G(t) = \sum_{i=1}^{M} \Delta d_i(t) - \sum_{i=1}^{M} \Delta o_i(t) - \sum_{j=1}^{J} \{b_j(t-1) + \sum_{i=1}^{\nu j} r_i(t) + \sum_{k=1}^{\beta j} w_k(t)\}$, and $o_i^d(t) = \Delta d_i(t) + \Delta l_i(t)$;

in response to $\sum_{i=1}^{M} \Delta d_i(t) - \sum_{i=1}^{M} \Delta o_i(t) < \sum_{j=1}^{J} \{b_j(t-1) + \sum_{i=1}^{\nu j} r(t) + \sum_{k=1}^{\beta j} w_k(t)\}$, setting:

$F^*(t) = \sum_{i=1}^{M} \Delta d_i(t) - \sum_{i=1}^{M} \Delta o_i(t)$, and $o_i^d(t) = \Delta d_i(t), G(t) = 0$; and
deciding $f^*_j(t)$ based on $F^*(t)$.

10. The method of claim 1, wherein:
the control variable values include:
curtailment capacity of the prosumers nodes $\{\overline{l}_1, \overline{l}_2, \ldots, \overline{l}_M\}$,
discharging rates of supply-side batteries for each time interval (t) $f_1(t), f_2(t), \ldots, f_j(t)$, and
updated sets of demands that are based on adjusted energy loads and energy production of the one or more prosumers of the VPP and adjusted energy supplied from the supply side of the VPP $\{d_1(t), d_2(t), \ldots, d_M(t)\}$; and
the adjusting curtailment of the energy loads in the prosumers includes in response to the total demand being greater than the DR capacity, dispatching a DR event to all prosumers with a non-zero curtailment amount.

11. A non-transitory computer-readable medium having encoded therein programming code executable by a processor to perform or control performance of operations comprising:
receiving, at a virtual power plant (VPP) controller server of VPP, one or more control variable values from a previous time interval for a plurality of control variables, the plurality of control variables being related to energy production and energy loads of devices that are electrically coupled to the electrical grid and communicatively coupled to the VPP controller server;
inputting, at the VPP controller server, the control variable values into an objective algorithm, the objective algorithm being configured to increase a contribution of renewable energy production to serve a demand and integration of energy source devices communicatively coupled to the VPP controller server and to reduce energy generation and integration of energy produced by the utility;
executing, by the VPP controller server, the objective algorithm, wherein executing the objective algorithm includes adjusting energy loads and energy production of one or more prosumers of the VPP, adjusting an energy amount supplied from a supply side of the VPP for one or more time intervals, and adjusting curtailment of the energy loads in the prosumers based on an adjusted energy supplied from the supply side of the VPP and adjusted energy loads and energy production of the one or more prosumers, the adjusting curtailment of the energy loads in the prosumers includes generating a set of curtailment amounts of loads for each of the prosumers and for each time interval (A1(t)), determining whether a total demand that is not covered by the renewable resource is smaller than a DR capacity, and in response to the total demand being smaller than the DR capacity, conducting a prosumer selection based on one or more or a combination of: participation likelihood of each prosumer for past DR events, curtailment capacity and estimation, a number of available and occupied resources, and a benefits and costs analysis;
based on the objective function, generating, at the VPP controller server, a VPP demand response (DR) event schedule that includes a charge/discharge schedule of one or more energy source devices and a charge/discharge schedule for one or more energy load devices; and
communicating in real time, by the VPP controller server, the VPP DR event schedule to one or more VPP client servers, the VPP DR event schedule including control signals that are configured to affect an operating condition of one or more of the devices that are controlled by the VPP client servers.

12. The non-transitory computer-readable medium of claim 11, wherein the operations further comprise communicating the control signals to the devices to affect an operating condition of the devices in accordance with the VPP DR event schedule.

13. The non-transitory computer-readable medium of claim 11, wherein:

the control variable values include:
  initial energy levels of electric vehicles (EV) of the one or more prosumers $\{e_1(0), e_2(0), \ldots, e_M(0)\}$,
  initial energy levels of stationary batteries of the one or more prosumers (pro batteries) $(s_1(0), s_2(0), \ldots, s_M(0))$,
  forecasted photovoltaic (PV) production for a current time interval for each PV associated with each of the prosumers (pro PV) $\{p_1(t), p_2(t), \ldots, p_M(t)\}$, and
  forecasted loads for the current time interval for each of the prosumers $\{l_1(t), l_2(t), \ldots, l_M(t)\}$; and
the adjusting the energy loads and the energy production of the one or more prosumers includes:
  receiving the control variable values as inputs; and
  generating for each of the prosumers at the current time interval an adjusted value for:
    a curtailed amount of PV generation ($\Delta p_i(t)$);
    a discharge amount from a pro battery ($u_i(t)$),
    a charge amount from a pro PV to a pro battery ($v_i(t)$),
    a discharge amount from one or more EVs ($x_i(t)$),
    a charge amount from a pro PV to a connected EV ($y_i(t)$),
    an amount of energy sent from a pro PV directly to the load ($z_i(t)$),
    discharge output from one or more pro batteries to the electrical grid ($o_i^s(t)$),
    discharge output from one or more of the EVs associated with the prosumer to the electrical grid ($o_i^e(t)$), and
    discharge output from one or more of the pro PVs to the electrical grid ($o_i^p(t)$),
    in which:
      t represents the current time interval,
      M represents a number of prosumers, and
      i is an indexing variable that ranges from 1 to M.

14. The non-transitory computer-readable medium of claim 13, wherein the adjusting the energy loads and the energy production of the one or more prosumers further includes:
  determining whether $p_i(t) \geq l_i(t)$;
  in response to $p_i(t) \geq l_i(t)$:
    setting:
      $z_i(t)=l_i(t)$,
      $u_i(t)=0$, and
      $x_i(t)=0$; and
    determining whether $s_i(t-1)+(p_i(t)-l_i(t)) \leq \overline{s_i}$;
    in response to $s_i(t-1)+(p_i(t)-l_i(t)) \leq \overline{s_i}$:
      setting:
        $v_i(t)=p_i(t)-l_i(t)$,
        $y_i(t)=0$,
        $o_i^s(t)=0$,
        $o_i^e(t)=0$,
        $o_i^p(t)=0$, and
        $\Delta p_i(t)=0$;
    in response to $s_i(t-1)+(p_i(t)-l_i(t)) > \overline{s_i}$
      setting $v_i(t)=\overline{s_i}-s_i(t-1)$, and
      determining whether $e_i(t-1)+(p_i(t)-l_i(t)-(\overline{s_i}-s_i(t-1))) \leq \overline{e_i}$; and in response to $e_i(t-1)+(p_i(t)-l_i(t)-(\overline{s_i}-s_i(t-1))) \leq \overline{e_i}$,
  setting:
    $y_i(t)=p_i(t)-l_i(t)-(\overline{s_i}-s_i(t-1))$,
    $o_i^s(t)=0$,
    $o_i^e(t)=0$,
    $o_i^p(t)=0$, and
    $\Delta p_i(t)=0$,
in which:
  $v_i(\ )$ represents a charge amount from a pro PV to a pro battery;
  $l_i(\ )$ represents a load at one of the prosumers;
  $s_i(\ )$ represents an energy level of a pro battery at t;
  t−1 represents a previous time interval;
  $x_i(\ )$ represents a discharge amount from one or more EVs;
  $y_i(\ )$ represents a charge amount from a pro PV of the prosumer to a connected EV;
  $p_i(\ )$ represents a forecasted PV production;
  $\overline{\phantom{p}}$ represents a maximum capacity of a parameter;
  $o_i^s(\ )$ represents discharge output from one or more pro batteries to the electrical grid;
  $o_i^p(\ )$ represents discharge output from one or more of the pro PVs to the electrical grid;
  $o_i^e(\ )$ represents discharge output from one or more of the EVs associated with the prosumer to the electrical grid;
  $\Delta p_i(\ )$ represents a curtailed amount of PV generation; and
  $e_i(\ )$ represents energy levels of an EV.

15. The non-transitory computer-readable medium of claim 14, wherein the adjusting the energy loads and the energy production of the one or more prosumers includes:
  in response to $e_i(t-1)+(p_i(t)-l_i(t)-(\overline{s_i}-s_i(t-1))) > \overline{e_i}$
    setting $y_i(t)=\overline{e_i}-e_i(t-1)$;
    determining whether $p_i(t)-(\overline{s_i}-s_i(t-1))-(\overline{e_i}-e_i(t-1))-l_i(t) \leq \overline{o_i^p}$;
    in response to $p_i(t)-(\overline{s_i}-s_i(t-1))-(\overline{e_i}-e_i(t-1))-l_i(t) \leq \overline{o_i^p}$,
      setting:
        $\Delta p_i(t)=0$,
        $o_i^s(t)=0$,
        $o_i^e(t)=0$, and
        $o_i^p(t)=p_i(t)-(\overline{s_i}-s_i(t-1))-(\overline{e_i}-e_i(t-1))-l_i(t)$;
    in response to $p_i(t)-(\overline{s_i}-s_i(t-1))-(\overline{e_i}-e_i(t-1))-l_i(t) > \overline{o_i^p}$:
      setting $o_i^p(t)=0$; and
      determining whether
        $p_i(t)-(\overline{s_i}-s_i(t-1))-(\overline{e_i}-e_i(t-1))-l_i(t)-\overline{o_i^p} \leq o_i^s$;
      in response to
        $p_i(t)-(\overline{s_i}-s_i(t-1))-(\overline{e_i}-e_i(t-1))-l_i(t)-\overline{o_i^p} \leq o_i^s$, setting:
        $o_i^s(t)=p_i(t)-(\overline{s_i}-s_i(t-1))-(\overline{e_i}-e_i(t-1))-l_i(t)-\overline{o_i^p}$,
        $v_i(t) \leftarrow v_i(t)+o_i^s(t)$, and
        $o_i^e(t)=0, \Delta p_i(t)=0$;
      in response to
        $p_i(t)-(\overline{s_i}-s_i(t-1))-(\overline{e_i}-e_i(t-1))-l_i(t)-\overline{o_i^p} < o_i^s$;

setting:

$o_i^s(t) = \overline{o_i^s}$, and $v_i(t) \leftarrow v_i(t) + \overline{o_i^s}$; and determining whether $p_i(t) - (\overline{s_i} - s_i(t-1)) - (\overline{e_i} - e_i(t-1)) - l_i(t) - \overline{o_i^p} - \overline{o_i^s} \leq o_i^e$;

in response to $p_i(t) - (\overline{s_i} - s_i(t-1)) - (\overline{e_i} - e_i(t-1)) - l_i(t) - \overline{o_i^p} - \overline{o_i^s} \leq o_i^e$, setting:

$o_i^e(t) =$ $p_i(t) - (\overline{s_i} - s_i(t-1)) - (\overline{e_i} - e_i(t-1)) - l_i(t) - \overline{o_i^p} - \overline{o_i^s}$, and $y_i(t) \leftarrow y_i(t) + o_i^e(t), \Delta p_i(t) = 0$; and in response to $p_i(t) - (\overline{s_i} - s_i(t-1)) - (\overline{e_i} - e_i(t-1)) - l_i(t) - \overline{o_i^p} - \overline{o_i^s} > o_i^e$, and setting:

$o_i^e(t) = \overline{o_i^s}, y_i(t) \leftarrow y_i(t) + \overline{o_i^e}$, and $\Delta p_i(t) =$ $p_i(\ ) - (\overline{s_i} - s_i(t-1)) - (\overline{e_i} - e_i)(t-1)) - l_i(t) - \overline{o_i^p} - \overline{o_i^s} - \overline{o_i^e}$.

16. The non-transitory computer-readable medium of claim 15, wherein the adjusting the energy loads and the energy production of the one or more prosumers includes:
in response to $p_i(t) < l_i(t)$:
setting:

$z_i(t) = p_i(t)$, $\Delta p_i(t) = 0$, $o_i^s(t) = 0$, $o_i^e(t) = 0$, $o_i^p(t) = 0$, $v_i(t) = 0$, and
$y_i(t) = 0$; and
determining whether $l_i(t) - p_i(t) \geq s_i(t-1)$;
in response to $l_i(t) - p_i(t) < s_i(t-1)$, setting:

$u_i(t) = l_i(t) - p_i(t)$, and $x_i(t) = 0$;

in response to $l_i(t) - p_i(t) \geq s_i(t-1)$,
setting $u_i(t) = s_i(t-1)$;
determining whether $l_i(t) - p_i(t) - s_i(t-1) \geq e_i(t-1)$;
in response to $l_i(t) - p_i(t) - s_i(t-1) \geq e_i(t-1)$, setting $x_i(t) = e_i(t-1)$;

in response to $l_i(t) - p_i(t) - s_i(t-1) < e_i(t-1)$, setting $x_i(t) = l_i(t) - p_i(t) - s_i(t-1)$.

17. The non-transitory computer-readable medium of claim 13, wherein:
the control variable values include:
initial charge levels of supply-side batteries of the supply side of the VPP $\{b_1(0), b_2(0), \ldots, b_J(0)\}$;
forecasted renewable generation for photovoltaic cells of the supply side of the VPP (supply PVs) $\{r_1(t), r_2(t), \ldots, r_N(t)\}$;
forecasted wind generation for wind turbines of the supply side of the VPP $\{w_1(t), w_2(t), \ldots, w_H(t)\}$; and
forecasted loads for prosumers $\{l_1(t), l2(t), \ldots, l_M(t)\}$; and
an adjusted value for $\Box p_i(t), u_i(t), v_i(t), x_i(t), y_i(t), z_i(t), o_i^s(t), o_i^e(t)$, and $o_i^p(t)$; and
adjusting energy supplied from the supply side of the VPP includes:
receiving the control variable values as inputs; and
generating adjusted values for:
a charge amount from a supply PV to a supply-side battery ($q_i(t)$);
a curtailment amount of PV generation ($\Delta r_g(t)$);
a charge amount from a wind turbine to a supply-side battery ($\omega_k(t)$);
a curtailment amount of wind generation ($\Delta w_k(t)$);
a discharge amount from a supply-side battery to loads ($f_j(t)$); and
energy sent from the electrical grid to a load at a prosumer ($o_i^d(t)$),
in which:
H represents the number of wind turbines in the supply side;
N represents the number of supply PVs in the supply side;
J represents the number of supply-side batteries;
k represents an indexing variable for the wind turbines with a range from 1 to H;
j represents an indexing variable for the supply-side batteries with a range from 1 to J;
i represents an indexing variable for the supply PVs with a range from 1 to N.

18. The non-transitory computer-readable medium of claim 17, wherein adjusting energy supplied from the supply side of the VPP includes:
initializing $f_j(t), g_i(t)$, and $\Delta l_i(t)$ to be zero;
defining $\Delta d_i(t) = l_i(t) - u_1(t) - x_i(t) - z_i(t)$ and $\Delta o_i = o_i^s(t) + o_i^e(t) + o_i^p(t)$, based on the results from the adjusting energy loads and energy production of one or more prosumers of the VPP;
determining whether $\sum_{i=1}^{N} r_i(t) + \sum_{k=1}^{H} w_k(t) \geq \sum_{i=1}^{M} \Delta d_i(t) - \sum_{i=1}^{M} \Delta o_i(t)$;
in response to $\sum_{i=1}^{N} r_i(t) + \sum_{k=1}^{H} w_k(t) \geq \sum_{i=1}^{M} \Delta d_i(t) - \sum_{i=1}^{M} \Delta o_i(t)$:
setting:

$F^*(t) = \sum_{i=1}^{M} \Delta d_i(t) - \sum_{i=1}^{M} \Delta o_i(t)$, $o_i^d(t) = \Delta d_i$, and $G(t) = 0$;

deciding $f^*_j(t)$ based on $F^*(t)$;
determining whether $b_j(t-1) + \sum_{i=1}^{v_j} r_i(t) - f^*_j(t) \leq \overline{b_j}$;
in response to $b_j(t-1) + \sum_{i=1}^{v_j} r_i(t) - f^*_j(t) \leq \overline{b_j}$:
setting $q_i(t) = r_i(t), \Delta r_i(t) = 0$;
determining whether $b_j(t-1) + \sum_{i=1}^{\beta_j} r_i(t) + \sum_{k=1}^{\beta_j} w_k(t) - f^*_j(t) \leq \overline{b_j}$;
in response to $b_j(t-1) + \sum_{i=1}^{\beta_j} r_i(t) + \sum_{k=1}^{\beta_j} w_k(t) - f^*_j(t) \leq \overline{b_j}$, setting $\omega_k(t) = w_k(t), \Delta w_k(t) = 0$;

in response to $b_j(t-1) + \sum_{i=1}^{v_j} r_i(t) + \sum_{k=1}^{\beta_j} w_k(t) - f^*_j(t) > \overline{b_j}$;

setting:

$\Sigma_{k=1}^{\beta j}\omega_k(t)=\overline{b_j}-b_j(t-1)-\Sigma_{i=1}^{\upsilon j}r_i(t)+f^*_j(t)$, and $\Sigma_{k=1}^{\beta j}\Delta w_k(t)=\Sigma_{k=1}^{\beta j}w_k(t)-\overline{b_j}-b_j(t-1)-\Sigma_{i=1}^{\upsilon j}r_i(t)+f^*_j(t))$; and calculating $\omega^*_i(t)$ based on $\Sigma_{k=1}^{\beta j}\omega_k(t)=\overline{b_j}-b_j(t-1)-\Sigma_{i=1}^{\upsilon j}r_i(t)+f^*_j(t)$;

in response to $b_j(t-1)+\Sigma_{i=1}^{\upsilon j}r_i(t)+\Sigma_{k=1}^{\beta j}w_k(t)-f^*_j(t)>\overline{bdj}$:

setting:

$\rho_{i=1}^{\upsilon j}q_i(t)=\overline{b_j}-b_j(t-1)+f^*_j(t)$, $\Sigma_{i=1}^{\upsilon j}\Delta r_i(t)=\Sigma_{i=1}^{\upsilon j}r_i(t)-\overline{b_j}-b_j(t-1)+f^*_j(t))$, and $\omega_k(t)=0, \Delta w_k(t)=w_k(t)$; and calculating $q^*_i(t)$ based on $\Sigma_{i=1}^{\upsilon j}q_i(t)=\overline{b_j}-b_j(t-1)+f^*_j(t)$.

19. The non-transitory computer-readable medium of claim 18, wherein adjusting energy supplied from the supply side of the VPP includes:

in response to $\Sigma_{l=1}r_l(t)+\Sigma_{k=1}^H w_k(t)\leq \Sigma_{i=1}^M \Delta d_i(t)-\Sigma_{i=1}^M \Delta o_i(t)$:

setting:

$q_i(t)=r_i(t)$, $\Delta r_i(t)=0$, $\omega_k(t)=w_k(t)$, and $\Delta w_k(t)=0$;

determining whether $\Sigma_{i=1}^M \Delta d_i(t)-\Sigma_{i=1}^M \Delta o_i(t) \geq \Sigma_{j=1}^J \{b_j(t-1)+\Sigma_{l=1}^{\upsilon j}r_i(t)+\Sigma_{k=1}^{\beta j}w_k(t)\}$;

in response to $\Sigma_{i=1}^M \Delta d_i(t)-\Sigma_{i=1}^M \Delta o_i(t) \geq \Sigma_{j=1}^J \{b_j(t-1)+\Sigma_{l=1}^{\upsilon j}r_i(t)+\Sigma_{k=1}^{\beta j}w_k(t)\}$, setting:

$f_j(t)=b_j(t-1)+\Sigma_{l=1}^{\upsilon j}r_i(t)+\Sigma_{k=1}^{\beta j}w_k(t)$, $G(t)=\Sigma_{i=1}^M \Delta d_i(t)-\Sigma_{i=1}^M \Delta o_i(t)-\Sigma_{j=1}^J \{b_j(t-1)+\Sigma_{l=1}^{\upsilon j}r_i(t)+\Sigma_{k=1}^{\beta j}w_k(t)\}$, and $o_i^d(t)=\Delta d_i(t)+\Delta l_i(t)$;

in response to $\Sigma_{i=1}^M \Delta d_i(t)-\Sigma_{i=1}^M \Delta o_i(t)<\Sigma_{j=1}^J \{b_j(t-1)+\Sigma_{l=1}^{\upsilon j}r_i(t)+\Sigma_{k=1}^{\beta j}w_k(t)\}$, setting:

$F^*(t)=\Sigma_{i=1}^M \Delta d_i(t)-\Sigma_{i=1}^M \Delta o_i(t)$, and $o_i^d(t)=\Delta d_i(t), G(t)=0$; and deciding $f^*_j(t)$ based on $F^*(t)$.

20. The non-transitory computer-readable medium of claim 11, wherein:

the control variable values include:
- curtailment capacity of the prosumers nodes $\{\overline{\Gamma_1}, \overline{\Gamma_2}, \ldots, \overline{\Gamma_M}\}$,
- discharging rates of supply-side batteries for each time interval (t) $\{f_1(t), f_2(t), \ldots, f_J(t)\}$, and
- updated sets of demands that are based on adjusted energy loads and energy production of the one or more prosumers of the VPP and adjusted energy supplied from the supply side of the VPP $\{d_1(t), d_2(t), \ldots, d_M(t)\}$; and the adjusting curtailment of the energy loads in the prosumers includes in response to the total demand being greater than the DR capacity, dispatching a DR event to all prosumers with a non-zero curtailment amount.

* * * * *